US006823111B2

(12) United States Patent
Jette et al.

(10) Patent No.: US 6,823,111 B2
(45) Date of Patent: Nov. 23, 2004

(54) OPTICAL WAVEGUIDE FILTERS

(75) Inventors: Stéphanie Marie-Julie Jette, Kanata (CA); Pierre Simon Joseph Berini, Ottawa (CA)

(73) Assignee: Spectalis Corp., Ottawa (CA)

( * ) Notice: Subject to any disclaimer, the term of this patent is extended or adjusted under 35 U.S.C. 154(b) by 644 days.

(21) Appl. No.: 09/915,363

(22) Filed: Jul. 27, 2001

(65) Prior Publication Data

US 2004/0081398 A1 Apr. 29, 2004

Related U.S. Application Data

(63) Continuation-in-part of application No. 09/742,422, filed on Dec. 22, 2000, now Pat. No. 6,614,960, and a continuation-in-part of application No. 09/629,816, filed on Jul. 31, 2000, now Pat. No. 6,442,321.
(60) Provisional application No. 60/299,731, filed on Jun. 22, 2001.

(30) Foreign Application Priority Data

| Jul. 31, 2000 | (CA) | ............................................. 2314723 |
| Sep. 20, 2000 | (CA) | ............................................. 2319949 |
| Dec. 22, 2000 | (CA) | ............................... PCT/CA00/01525 |

(51) Int. Cl.[7] .......................... G02B 6/10; G02B 6/34; G02B 6/12
(52) U.S. Cl. ....................... 385/37; 385/130; 385/131; 385/39; 385/42; 385/50
(58) Field of Search ............................ 385/1–4, 11, 15, 385/31, 37, 39, 42, 50, 129–132

(56) References Cited

U.S. PATENT DOCUMENTS

| 4,765,705 A | * | 8/1988 | Seymour et al. ............... 385/37 |
| 5,615,289 A | | 3/1997 | Duck et al. .................... 385/10 |
| 6,034,809 A | * | 3/2000 | Anemogiannis ............ 359/254 |
| 6,064,685 A | | 5/2000 | Bissessur et al. ........... 372/102 |
| 6,072,926 A | | 6/2000 | Cole et al. ..................... 385/37 |

FOREIGN PATENT DOCUMENTS

| DE | 4240707 C1 | 2/1994 | ............ G02B/6/12 |
| EP | 0810454 A1 | 12/1997 | ............ G02B/3/124 |
| WO | WO01/48521 | 7/2001 | ............ G02B/6/12 |

OTHER PUBLICATIONS

Tredicucci, A. et al, "Single–Mode Surface–Plasmon Laser", Applied Physics Letters, vol. 76, No. 16, p. 2164, 2000.

Berini, P., "Plasmon–Polariton Waves Guided by Thin Lossy Metal Films of Finite Width: Bound Modes of Symmetric Structures", Physical Review B, vol. 61, No. 15, p. 10484, 2000.

Charbonneau, R. Berini, P. et al, "Long–Range Plasmon–Polariton Wave Propagation in Thin Metal Films of Finite–Width Excited Using an End–Fire Technique", Proceedings of SPIE, vol. 4087, p. 534, 2000.

*Primary Examiner*—Brian Healy
*Assistant Examiner*—Kevin S. Wood
(74) *Attorney, Agent, or Firm*—Thomas Adams

(57) ABSTRACT

A grating, suitable for filtering optical radiation, comprises a plurality of concatenated grating sections each having different physical characteristics as compared with adjacent grating sections. At least one of the sections comprises a waveguide structure formed by a thin strip (100) of a material having a relatively high free charge carrier density surrounded by material having a relatively low free charge carrier density. The strip has finite width (W) and thickness (t) with dimensions such that optical radiation having a wavelength in a predetermined range couples to the strip and propagates along the length of the strip as a plasmon-polariton wave. Various grating architectures may be implemented, e.g. chirped, interleaved, uniform, etc. A method of producing such gratings derives normalized phase constants and attenuation constants and then uses, for example, TMM or Coupled Mode Theory to derive therefrom the optical response of the grating.

38 Claims, 23 Drawing Sheets

OTHER PUBLICATIONS

Berini, P. "Plasmon–Polariton Modes Guided by a Metal Film of Finite Width Bounded by Different Dielectrics", Optics Express, vol. 7, No. 10, p. 329, 2000.

Berini, P. "Plasmon–Polariton Modes Guided by a Metal Film of Finite Width", Optics Letters, vol. 24, No. 15, p. 1011, 1999.

Charbonneau, R., Berini, P. "Experimental Observation of Plasmon–Polariton Waves Supported by a Thin Metal Film of Finite Width", Optics Letters, vol. 25, No. 11, p. 844, 2000.

Berini, P. "Plasmon–Polariton Waves Guided by Thin Lossy Metal Films of Finite Width: Bound Modes of Asymmetric Structures", Physical Review B, vol. 63, 125417–2001.

Boardman, A.D., Editor. Electromagnetic Surface Modes. Wiley Interscience, 1982.

Pregla, R., Pascher, W. "The Method of Lines", Numerical Techniques for Microwave and Millimeter–Wave Passive Structures. Wiley Interscience, 1989. T. Itoh Editor.

Berini, P., Wu, K. "Modeling Lossy Anisotropic Dielectric Waveguides with the Method of Lines", IEEE Transactions on Microwave Theory and Techniques, vol. MTT–44, No. 5 (May 1996) pp. 749–759.

Berini, P. Stohr, A., Wu, K., Jager, D. "Normal Mode Analysis and Characterization of an InGaAs/GaAs MQW Field–Induced Optical Waveguide Including Electrode Effects", Journal of Lightwave Technology vol 14 No 10 (Oct. 1996) pp 2422–2435.

Yeh, Pochi. "Optical Waves in Layered Media", Wiley, 1988.

Vinogradox, A.V. "X–Ray and Far UV Multilayer Mirrors: Principles and Possbilities", Applied Optics, vol. 16, No. 1, p. 89, 1977.

Glyisis E N et al "High –Spatial–Frequency Binary and Multivelvel Stairstep Gratings: Polarization–Selective Mirrors and Broadband Antifeflection Surfaces" Applied Optics, Optical Society of America, washingtom US vol. 31 No. 22.

Liu J. et al " Infrared Quarter–Wave Reflector Retarders Designed with High–Spatial–Frequency Dielectric Surface–Relief Gratings on Goldsubstrate at Oblique Incidence" Applied Opticsa, Optical Society of America, Washington US vol. 35, No 28.

Loh W H et al "Sampled Fiber Grating Based–Dispersion Slope Compensator" IEEE Photonics Technology Letters, IEEE Inc. New York, US, vol. 11, No. 10, Oct. 1999.

* cited by examiner

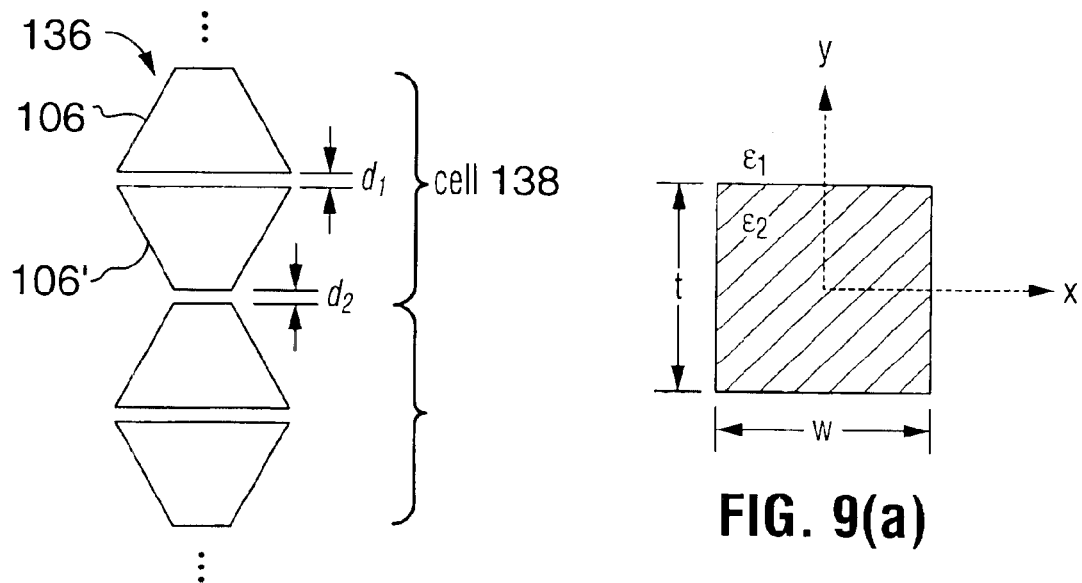
FIG. 8
FIG. 9(a)
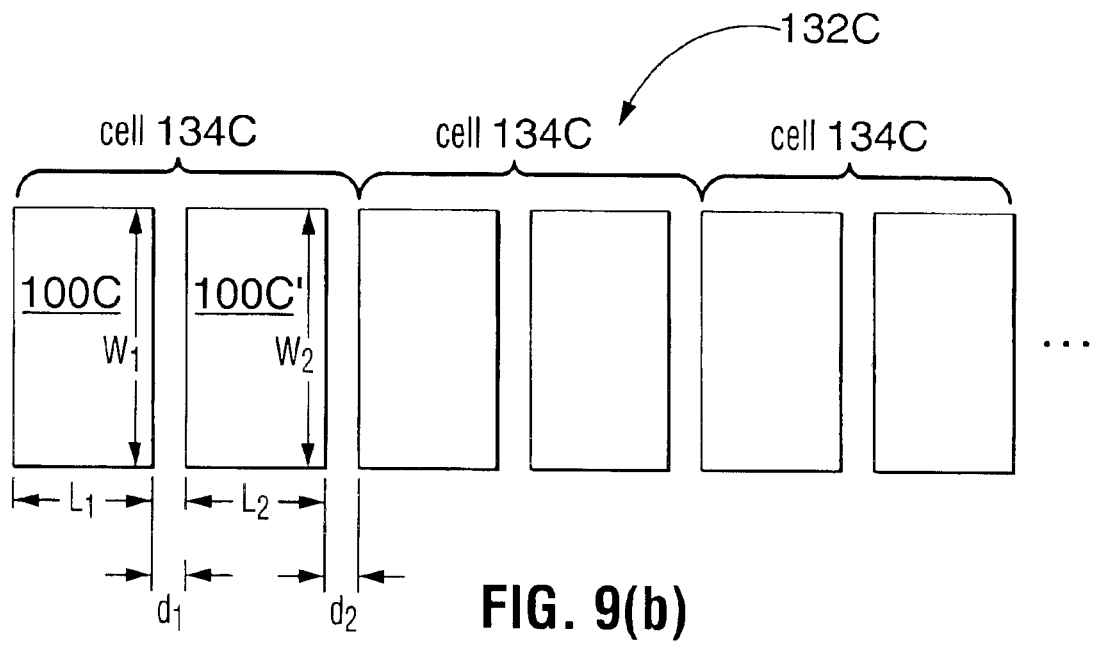
FIG. 9(b)

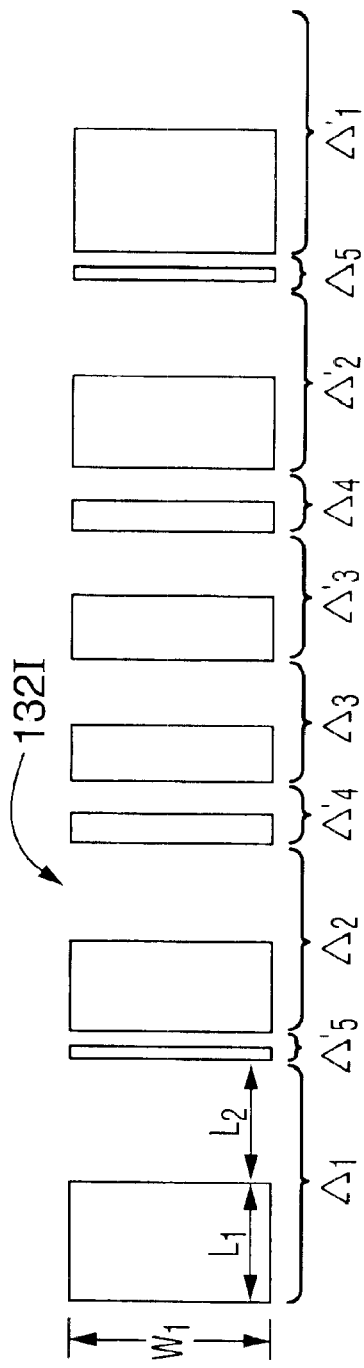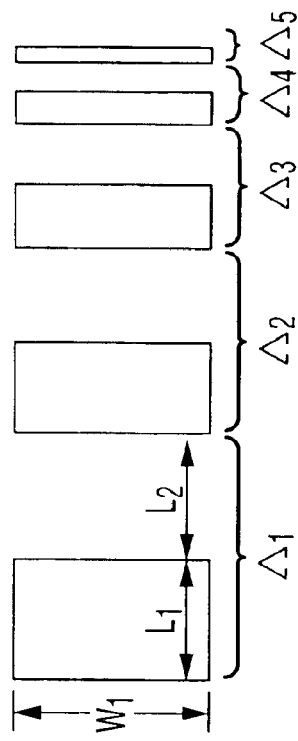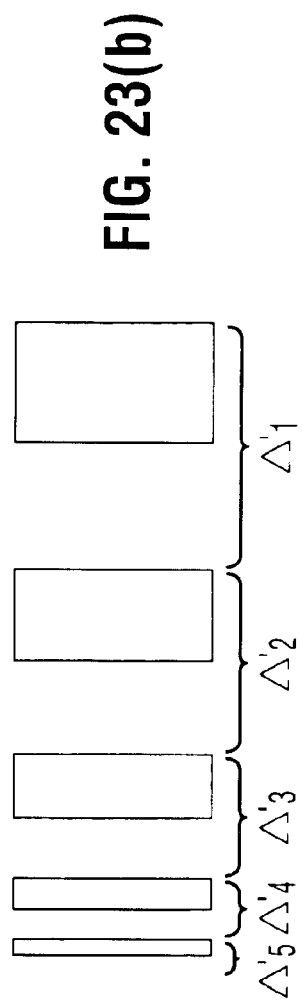

OPTICAL WAVEGUIDE FILTERS

Priority is being claimed from a U.S. Provisional application No. 60/299,731, filed Jun. 22, 2001 entitled "Optical Waveguide Filters".

This is a Continuation-in-Part of U.S. patent applications Ser. No. 09/742,422 filed Dec. 22, 2000 now U.S. Pat. No. 6,614,960, and Ser. No. 09/629,816 filed Jul. 31, 2000 now U.S. Pat. No. 6,442,321.

FIELD OF THE INVENTION

The present invention relates to optical devices and especially to optical waveguide filters for integrated optics.

BACKGROUND OF THE INVENTION

This specification refers to several published articles. For convenience, the articles are cited in fill in a numbered list at the end of the description and cited by number in the specification itself. The contents of these articles are incorporated herein by reference and the reader is directed to them for reference.

In the context of this patent specification, the term "optical radiation" embraces electromagnetic waves having wavelengths in the infrared, visible and ultraviolet ranges.

The terms "finite" and "infinite" as used herein are used by persons skilled in this art to distinguish between waveguides having "finite" widths in which the actual width is significant to the performance of the waveguide and the physics governing its operation and so-called "infinite" waveguides where the width is so great that it has no significant effect upon the performance and physics or operation.

The theory of optical filters is well known in the art. Filters often are an integral part of optical systems. With the growing demand for dense-wavelength-division-multiplexing (DWDM) systems, the need for better filters with improved spectral characteristics (low sidelobe levels, narrow bandwidths, and high reflectance) is increasing. The ideal reflection filter response is characterized by unity reflection in the reflection band, fast roll-off of the response in the transition region and zero transmission outside of the reflection band. All existing filter technologies have non-ideal characteristics. Close to unity reflection is typically achieved within the band of interest, while out-of-band regions suffer from high sidelobe levels. High sidelobe levels and non-unity reflection in the reflection bandwidth can cause inter-channel cross talk in closely spaced DWDM channels. To avoid this effect, channel spacing is increased, reducing the capacity of communication networks. To remedy this issue, methods to improve filter characteristics are currently being sought.

Many filter technologies currently exist in the art, including multilayer interference filters or mirrors, fiber Bragg gratings, metallic gratings, and corrugated-waveguide gratings. Generally, these filter-types employ Bragg reflection. None of these technologies are without limitations that impede on the ideality of the spectral characteristics of their filters. Basic filter design concepts are found throughout the art and apply to all of the aforementioned technologies. The concept of Bragg reflection is linked to the period or pitch p of the grating structure, which dictates the particular wavelength, or Bragg wavelength $\lambda_B$, to be reflected. Reflection within the structure is created by the constructive addition of micro-reflections occurring at each interface, as caused by a refractive index perturbation introduced along the length of the structure. A main difference among the existing technologies in the art is the physical construction of this refractive index perturbation.

The multi-layer filter or mirror is composed of a superposition of thin films with different refractive indices and layer thicknesses t. The proper selection of the thickness of each film arranged in a periodic, chirped or other fashion would create a strong reflection at a particular wavelength and angle of incidence.

Fiber Bragg gratings (FBG's) are created by photo-inducing a variation or perturbation of the refractive index in the core of an optical fiber constructed from appropriate materials. Numerous fabrication methods exist; the foremost method is based on the concept of a phase mask. A phase mask is a silica plate onto which a corrugated grating structure is etched. The design of the phase mask pitch is directly related to the Bragg period of the grating that will be photo-induced into the fiber core. A large body of work exists on the design and construction of FBG's. Despite the apparent maturity of this technology, fiber Bragg gratings are limited by fabrication issues and non-ideal out-of-band characteristics.

Corrugated-waveguide gratings are another filter technology. They have found great use in the field of distributed-feedback (DFB) lasers. A corrugated grating, with pitch p and variable profile (square, sinusoidal, or other) is etched into a semiconductor waveguide layer, patterned using photolithography techniques.

A corrugated metal grating comprises such a semiconductor grating coated by a thin metal film (several nm thick) to form a coated corrugated-waveguide grating or metal grating. The art of metallic gratings has emerged from the discovery of absorption anomalies, which are caused by the excitation of surface-plasmon modes at a single semiconductor-metal interface. The patterning of the metal layer in the form of a metal grating improves the coupling and mode selection of an external electromagnetic excitation to a surface-plasmon mode. These devices are also being investigated for their photonic band-gap structures.

Reference [1] discloses a Quantum-Cascade (QC) laser which employs a metal grating and makes use of surface-plasmon modes excited at a single "infinitely wide" metal-semiconductor interface. The grating is included within the semiconductor laser structure to enhance mode selection, that is, create single mode selection through Bragg reflection. The grating comprises deposited strips of titanium covered by a thick evaporated layer of gold to create a metal-grating structure with alternating stripes of pure Au and Ti/Au defining the refractive index perturbation.

At present, none of the above-described technologies are without limitations.

SUMMARY OF THE INVENTION

An object of the present invention is to provide an alternative to the above-mentioned filter design technologies, and/or to mitigate some of the limitations of the prior art.

According to one aspect of the present invention, there is provided a grating, suitable for filtering optical radiation, comprising a plurality of concatenated grating sections, physical characteristics of each section differing from physical characteristics of each adjacent section so that the propagation constants of adjacent sections differ, at least some of the sections each comprising a waveguide structure formed by a thin strip (100) of a material having a relatively high free charge carrier density surrounded by material having a relatively low free charge carrier density, the strip having finite width (W) and thickness (t) with dimensions such that optical radiation having a wavelength in a predetermined range couples to the strip and propagates along the length of the strip as a plasmon-polariton wave.

The strip may comprise for example, a metal or a highly doped semiconductor. The surrounding material may comprise, for example, an insulator or undoped or lightly doped semiconductor.

A plasmon-polariton filter or grating embodying this invention may be constructed by patterning a section of the waveguide strip, that is, varying its width w along the direction of propagation to create a physical perturbation in the waveguide over a certain section of length L. Another grating embodiment introduces a pattern of narrow metal gaps of appropriate size between metal strips over a certain section of the strip of length L to create the physical perturbation. The 'gaps' may be filled by either the surrounding material, another material, e.g. dielectric, or another strip having a different high free charge carrier density. The pattern may take any form that adheres to the constraints of the applied fabrication method.

The plurality of concatenated grating sections may comprise a series of cells, each cell comprising two grating sections, said series comprising a first set of cells ($\Lambda_1$, $\Lambda_2$, ... $\Lambda_S$) and a second set of cells ($\Lambda_1'$, $\Lambda_2'$, ... $\Lambda_S'$), different from each other and interleaved alternately cell by cell.

Preferably, the first set is equivalent to the second set transposed longitudinally.

According to a second aspect of the invention, there is provided a method of designing a grating suitable for filtering optical radiation within a specified range of wavelengths and formed from a waveguide strip surrounded by a dielectric material, the method comprising the steps of:

(i) using a numerical analysis method, deriving for said specified wavelengths, a waveguide strip of a particular material, and a particular surrounding dielectric material, normalized phase constant ($\beta/\beta_0$) and normalized attenuation constant ($\alpha/\beta_0$) for a particular waveguide strip thickness and each of several waveguide widths, or for a particular waveguide width and for each of a plurality of waveguide thicknesses;

(ii) determining a particular structure for the grating as comprising a series of strips having a predetermined overall length, adjacent strips in the series having different widths, or a series of strips all having the same width and with spaces between adjacent ones of the strips, or a series of strips having spaces between adjacent strips, alternate strips having different widths, and selecting for each of said strips a particular length;

(iii) using the normalized phase constants and normalized attenuation constants derived in step (i), obtaining the complex effective refractive index ($\tilde{n}_{\text{eff}}=\beta/\beta_0-j\alpha/\beta_0$) for each of said strips said series;

(iv) constructing an equivalent stack of dielectric slabs, each slab taking on the complex effective refractive index of the corresponding strip in said series of strips; and (v) deriving the optical response of the equivalent stack, (vi) if the derived optical response is not the desired optical response, repeating steps (ii), (iii), (iv) and (v) with different parameters for the grating; and (vii) if the derived optical response is the desired optical response, fabricating the grating with said particular structure.

The optical response may be derived using a transfer matrix method or coupled mode theory. Where the grating is uniform, however, the optical response also may be derived using the Bloch theorem.

Thus, the spectral behavior of the plasmon-polariton gratings may be determined through a fill-wave Transfer Matrix Method algorithm that incorporates the results of a Method of Lines (MoL) modeling tool that solves for the complex refractive index of the fundamental mode supported by the finite width symmetrical metal waveguide sections. The plasmon-polariton gratings are modeled as an equivalent stack of thin dielectric slices. The group delay of the grating may be found numerically by applying a finite-difference formula of $O(h^4)$.

Numerous design architectures are supported by the plasmon-polariton gratings, among them: uniform periodic gratings; non-periodic or chirped gratings; step-chirped gratings; interleaved non-periodic or chirped gratings; interleaved periodic gratings; apodized structures and higher order structures. All of the above mentioned design architectures are disclosed in full hereafter in the detailed description of the present invention Other advantages and features of the present invention will be readily apparent from the following detailed description, examples of preferred embodiments, the drawings and claims.

BRIEF DESCRIPTION OF THE DRAWING

FIG. 6(a) is a representation of the intensity reflectance with respect to N, where N is the number of periods, for various values of duty cycle in the range 25% to 75%. FIG. 6(b) shows a 3-D representation of the variation of the Intensity Reflection with respect to N for various values of duty cycle. Each curve of FIG. 6(b) is for one duty cycle value where the increment was set to 5%.

FIG. 8 is a plan view of a periodic waveguide structure formed by a series of cells each comprising two opposed trapezoidal waveguide sections;

FIG. 9(a) is a cross-sectional illustration of a square waveguide structure in which the core is comprised of a metal film of thickness t, width w, where t≈w, and permittivity $\epsilon_2$ embedded in a cladding or background comprising an "infinite" homogeneous dielectric having a permittivity $\epsilon_1$;

FIG. 9(b) is a plan view of a periodic waveguide structure formed by a series of cells each comprising two waveguide sections having different widths and lengths where the waveguide sections have a square cross-section;

FIG. 10(a) Normalized phase constant; FIG. 10(b) Normalized attenuation constant;

FIG. 12(a) illustrates the intensity reflectance and reflectance on a linear scale; FIG. 12(b) illustrates the intensity reflectance on a logarithmic scale; FIG. 12(c) illustrates the group delay on a linear scale;

FIG. 13(a) illustrates the sine apodized uniform periodic grating FIG. 13(b) illustrates the unapodized uniform periodic grating;

FIG. 14(a) illustrates the width variation of the waveguide sections along the grating length; FIG. 14(b) illustrates the desired sine profile of the effective refractive index along the grating length;

FIG. 15(a) illustrates the intensity reflectance and reflectance on a linear scale; FIG. 15(b) illustrates the intensity reflectance on a logarithmic scale; FIG. 15(c) illustrates the group delay on a linear scale;

FIG. 17(a) illustrates the intensity reflectance and reflectance on a linear scale; FIG. 17(b) illustrates the intensity reflectance on a logarithmic scale; FIG. 17(c) illustrates the group delay on a linear scale;

FIG. 19(a) illustrates the intensity reflectance and reflectance on a linear scale; FIG. 19(b) illustrates the intensity reflectance on a logarithmic scale; FIG. 19(c) illustrates the group delay on a linear scale;

FIG. 21(a) illustrates the intensity reflectance and reflectance on a linear scale; FIG. 21(b) illustrates the intensity reflectance on a logarithmic scale; FIG. 21(c) illustrates the group delay on a linear scale;

FIG. 22 illustrates a chirped interleaved grating;

FIGS. 23(a) and 23(b) are plan views of chirped gratings formed by a series of cells each comprising one waveguide section and a gap of different lengths which, when interleaved, would form the grating of FIG. 22.

FIG. 24(a) illustrates the intensity reflectance and reflectance on a linear scale; FIG. 24(b) illustrates the intensity reflectance on a logarithmic scale; FIG. 24(c) illustrates the group delay on a linear scale.

DETAILED DESCRIPTION

Plasmon-polariton filters or gratings embodying this invention are useful for the processing and filtering of light, especially at communications wavelengths near 1550 nm. Devices of this invention are based on the waveguide configuration shown in FIGS. 1(a) and 1(b) and disclosed in co-pending International patent application PCT/CA 00/01525 and in references [2] through [7] to which the reader is directed for reference and which are incorporated herein by reference.

Figure 25:
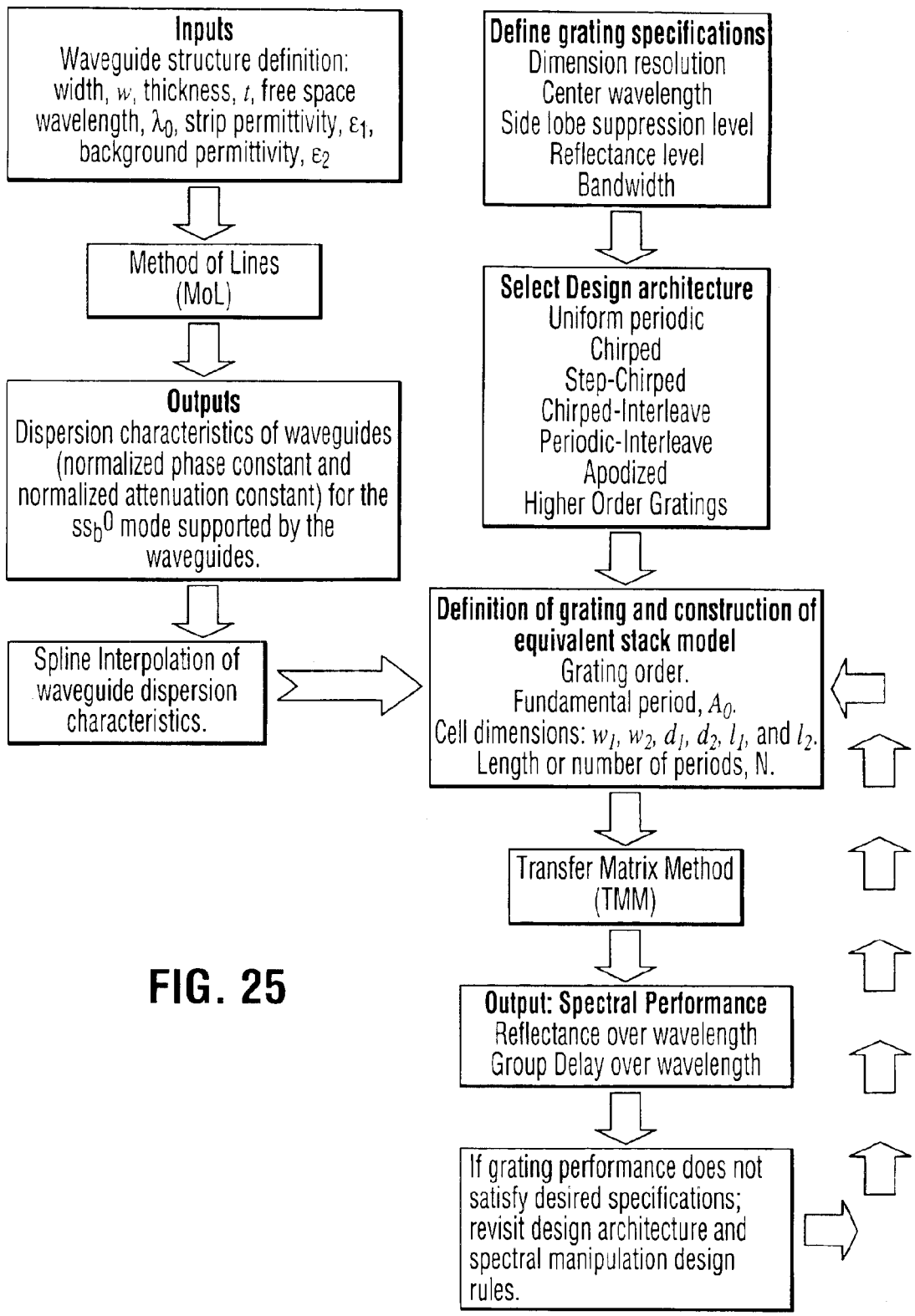
FIG. 25 is a block diagram depicting the design sequence for gratings embodying the present invention.

The design procedure for a grating using such a waveguide structure will be described first, followed by specific examples of such gratings. The design procedure is depicted in FIG. 25 and begins with an analysis of the waveguide structure, using Method of Lines, to determine dispersion characteristics.

It should be noted that the invention is not limited to the use of the Method of Lines, however. Other numerical analysis methods may be used instead; for example, the Finite Element Method, the Finite Difference Method or any other suitable method.

Methodology

Method of Lines (MoL) Numerical Technique

The symmetric waveguide structure used to construct the embodiments of this invention, shown in FIG. 1, comprises a lossy metal film of thickness t, width w and equivalent permittivity $\epsilon_2$, surrounded by a cladding or background comprising an "infinite" homogeneous dielectric of permittivity $\epsilon_1$. The Cartesian coordinate axes used for the analysis are also shown with propagation taking place along the z axis, which is out of the page. Suitable materials for the waveguide strip include, but are not limited to, gold, silver, copper, aluminum, and highly n- or p-doped GaAs, InP or Si, while suitable materials for the surrounding material include, but are not limited to, glass, quartz, polymer and undoped or very lightly doped GaAs, InP or Si. Particularly suitable combinations of materials include Au for the strip and $SiO_2$ for the surrounding material.

Figure 1A:
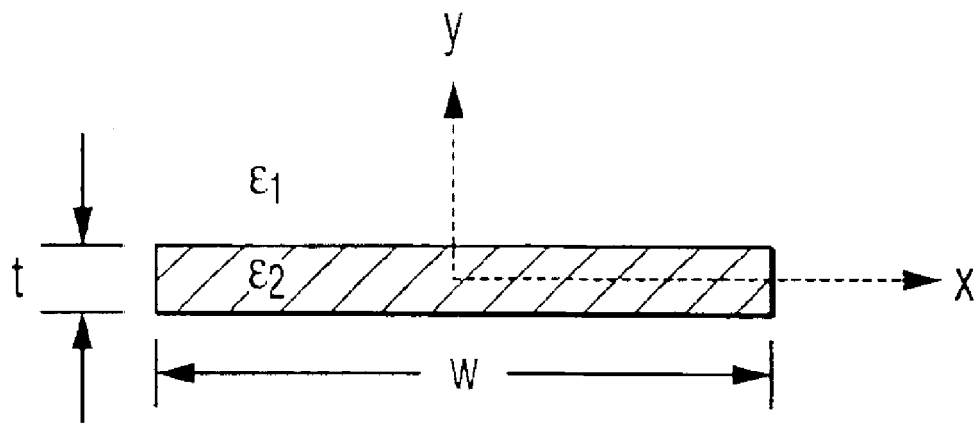
FIG. 1(a) is a cross-sectional illustration of a symmetric waveguide structure in which the core is comprised of a metal film of thickness t, width w and permittivity $\epsilon_2$ embedded in a cladding or background comprising an "infinite" homogeneous dielectric having a permittivity $\epsilon_1$.
Figure 1B:
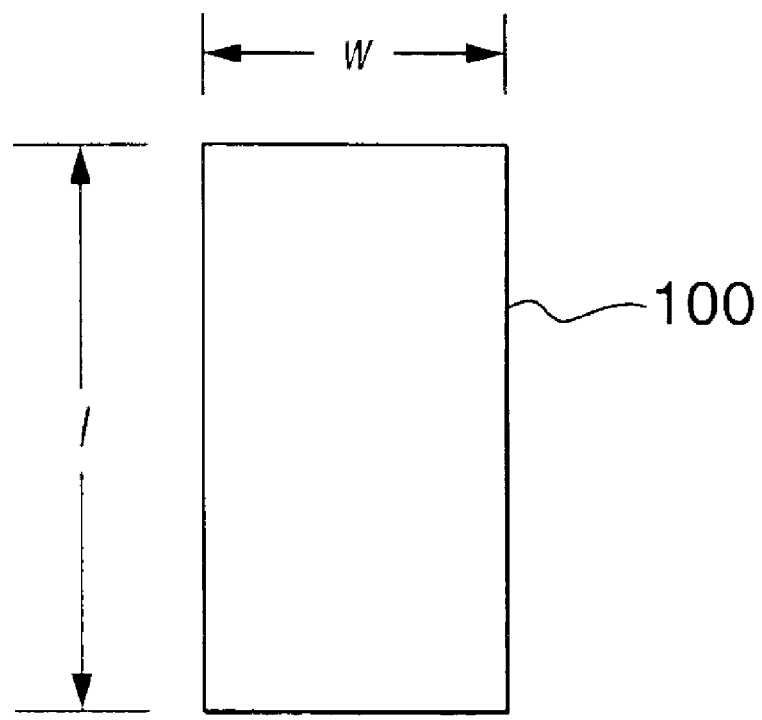
FIG. 1(b) shows the same structure in plan view.

It is assumed that the metal region shown in FIG. 1(a) can be modelled as an electron gas over the wavelengths of interest. According to classical or Drude electron theory, the complex relative permittivity of the metal region is given by the well-known plasma frequency dispersion relation [8]:

$$\varepsilon_{r,2} = \left(1 - \frac{\omega_p^2}{\omega^2 + v^2}\right) - j\left(\frac{\omega_p^2 v}{\omega(\omega^2 + v^2)}\right) \quad (1)$$

where $\omega$ is the excitation frequency, $\omega_p$ is the electron plasma frequency and $v$ is the effective electron collision frequency, often expressed as $v=1/\tau$ with $\tau$ defined as the relaxation time of electrons in the metal. When $\omega^2+v^2<\omega_p^2$ (which is the case for many metals at optical wavelengths) a negative value for the real part $\epsilon_{r,2}$ is obtained, implying that plasmon-polariton modes can be supported at interfaces with normal dielectrics.

The modes supported by the structures are obtained by solving a suitably defined boundary value problem based on Maxwell's equations written in the frequency domain for a lossy inhomogeneous isotropic medium. Uncoupling Maxwell's equations yields the following time-harmonic vectorial wave equations for the E and H fields:

$$\nabla \times \nabla \times E - \omega^2 \epsilon(x,y) \mu E = 0 \quad (2)$$

$$\nabla \times (\epsilon(x,y)^{-1} \nabla \times H) - \omega^2 \mu H = 0 \quad (3)$$

where the permittivity $\epsilon$ is a complex function of cross-sectional space, and describes the waveguide structure. For the waveguide structures disclosed herein, $\mu$ is homogeneous and taken as the permeability of free space $\mu_0$.

Due to the nature of the numerical method used to solve the boundary value problem, the implicit $\gamma$ dependence of the permittivity can be immediately removed since any inhomogeneity along $\gamma$ is treated by dividing the structure into a number of layers that are homogeneous along this direction, and suitable boundary conditions are applied between them.

The two vectorial wave equations (2) and (3) are expanded in each layer into scalar wave equations, some being coupled by virtue of the remaining inhomogeneity in $\epsilon$ along x. Since the waveguide structure under consideration is invariant along the propagation axis (taken to be in the $^+$z direction), the mode fields vary along this dimension according to $e^{-\gamma z}$ where $\gamma=\alpha+j\beta$ is the complex propagation constant of the mode, $\alpha$ being its attenuation constant and $\beta$ its phase constant. Substituting this field dependency into the scalar wave equations, and writing them for $TE^x$ ($E_x=0$) and $TM^x$ ($H_x=0$) modes while making use of $\nabla \cdot [\epsilon(x)E]=0$ and $\nabla \cdot H=0$ accordingly, yields simplified and uncoupled scalar wave equations that are readily solved. The $E_y$ component of the $TE^x$ modes must satisfy the Helmholtz wave equation:

$$\frac{\partial^2}{\partial x^2} E_y^{TE} + \frac{\partial^2}{\partial y^2} E_y^{TE} + [\gamma^2 + \omega^2 \mu \varepsilon(x)] E_y^{TE} = 0 \quad (4)$$

and the $H_y$ component of the $TM^x$ modes must satisfy the Sturm-Liouville wave equation:

$$\varepsilon(x) \frac{\partial}{\partial x}\left[\frac{1}{\varepsilon(x)} \frac{\partial}{\partial x} H_y^{TM}\right] + \frac{\partial^2}{\partial y^2} H_y^{TM} + [\gamma^2 + \omega^2 \mu \varepsilon(x)] H_y^{TM} = 0 \quad (5)$$

The superposition of the $TE^x$ and $TM^x$ mode families then describes any mode propagating in the structure analyzed. The electric and magnetic field components resulting from this superposition are given by the following equations:

$$E_x = \frac{-1}{j\omega\gamma}\left[\frac{\partial}{\partial x}\left(\frac{1}{\varepsilon(x)} \frac{\partial}{\partial x} H_y^{TM}\right) + \omega^2 \mu H_y^{TM}\right] \quad (6)$$

$$E_y = E_y^{TE} - \frac{1}{j\omega\gamma\varepsilon(x)} \frac{\partial^2}{\partial x \partial y} H_y^{TM} \quad (7)$$

$$E_z = \frac{1}{\gamma} \frac{\partial}{\partial y} E_y^{TE} + \frac{1}{j\omega\varepsilon(x)} \frac{\partial}{\partial x} H_y^{TM} \quad (8)$$

$$H_x = \frac{1}{j\omega\gamma}\left[\frac{1}{\mu} \frac{\partial^2}{\partial x^2} E_y^{TE} + \omega^2 \varepsilon(x) E_y^{TE}\right] \quad (9)$$

$$H_y = \frac{1}{j\omega\gamma\mu} \frac{\partial^2}{\partial x \partial y} E_y^{TE} + H_y^{TM} \quad (10)$$

$$H_z = -\frac{1}{j\omega\mu} \frac{\partial}{\partial x} E_y^{TE} + \frac{1}{\gamma} \frac{\partial}{\partial y} H_y^{TM} \quad (11)$$

In order to obtain a mode of propagation supported by a waveguiding structure, the Helmholtz and Sturm-Liouville wave equations (4) and (5), along with the field equations (6)–(11), must be solved for the propagation constant $\gamma$ using appropriate boundary conditions applied between layers and at the horizontal and vertical limits.

The power confinement factor is defined as the ratio of mode complex power carried through a portion of a waveguide's cross-section with respect to the mode complex power carried through the entire waveguide cross-section. Formally it is expressed as:

$$cf = \frac{\left|\iint_{A_c} S_z \, ds\right|}{\left|\iint_{A_\infty} S_z \, ds\right|} \quad (12)$$

where $A_0$ is usually taken as the area of the waveguide core and $A_\infty$, implies integration over the entire waveguide cross-section (which can be all cross-sectional space for an open structure) or the entire cross-sectional computational domain. $S_z$ refers to the z component of the Poynting vector:

$$S_z = \frac{1}{2}(E_x H_y^* - E_y H_x^*) \quad (13)$$

and $H_{x,y}^+$ denotes the complex conjugate of $H_{x,y}$. The spatial distribution of a component of the Poynting vector is easily computed from the spatial distribution of the relevant electric and magnetic mode field components.

The boundary value problem governed by equations (4) to (11) is solved by applying the Method of Lines (MoL). The MoL is a well-known numerical technique and its application to various electromagnetic problems, including optical waveguiding, is well-established [9]. The MoL is rigorous, accurate and flexible. It can handle a wide variety of waveguide geometries, including the structures at hand. The method is not known to generate spurious or non-physical modes. The MoL formulation used herein is based on the formulation reported in [10], but simplified for isotropic media, as prescribed by equations (4)–(11) and reported in [11]. Except for a 1-D spatial discretization, the method is exact.

The main idea behind the MoL is that the differential field equations governing a waveguiding problem are discretized only as far as necessary so that generalized analytic solutions can be applied to derive a homogeneous matrix problem describing all modes supported by the structure. This approach renders the method accurate and computationally efficient since only N–1 dimensions must be discretized to solve an N dimension problem. In the case of a two-dimensional (2-D) waveguiding structure, this means that only one spatial dimension needs to be discretized. The main features of this procedure, as applied to a modal analysis problem, are described below.

- The x axis and the function $\epsilon(x)$ are discretized using two shifted non-equidistant line systems, parallel to the y axis.
- The differential operators $\partial/\partial x$ and $\partial^2/\partial^2 x$ in the wave and field equations are replaced by finite difference approximations that include the lateral boundary conditions.
- The discretized wave equations are diagonalized using appropriate transformations matrices.
- The diagonalization procedure yields in the transform domain two systems of uncoupled one-dimensional (1-D) differential equations along the remaining dimension (in this case along the y axis).
- These differential equations are solved analytically and tangential field matching conditions are applied at interfaces between layers along with the top and bottom boundary conditions.
- The last field matching condition, applied near the center of the structure, yields a homogeneous matrix equation of the form $G(\gamma)\tilde{e}=0$ which operates on transformed tangential fields.
- The complex propagation constant $\gamma$ of modes is then obtained by searching for values that satisfy $\det[G(\gamma)]=0$.
- Once the propagation constant of a mode has been determined, the spatial distribution of all six field components of the mode are easily generated.
- A mode power confinement factor can be computed by first computing the spatial distribution of $S_z$ which is then integrated according to Equation (12)

The open structure shown in FIG. 1(a) is discretized along the x axis and the generalized analytic solution applied along the $\gamma$ axis. The physical symmetry of the structures is exploited to increase the accuracy of the results and to reduce the numerical effort required to generate the mode solutions. For the symmetric structure shown in FIG. 1(a), this is achieved by placing either electric wall ($E_{tan}=0$) or magnetic wall ($H_{tan}=0$) boundary conditions along the x and y axes. The remaining horizontal boundary conditions are placed at infinity and the remaining lateral boundary condition is either placed far enough from the guide to have a negligible effect on the mode calculation, or a lateral absorbing boundary condition is used to simulate infinite space, depending on the level of confinement observed in the resulting mode.

Mode Characteristics

Figure 2A:
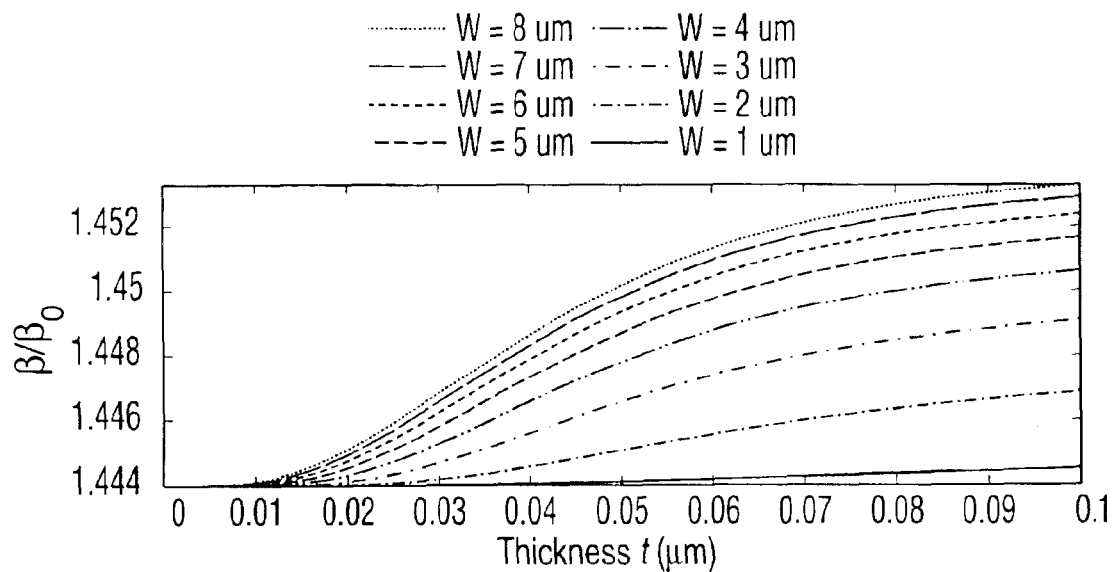
FIGS. 2(a) and 2(b) illustrate dispersion characteristics with thickness of the fundamental symmetric mode $SS_b^0$ for different waveguide widths w. (a) Normalized phase constant; (b) Normalized attenuation constant.
Figure 2B:
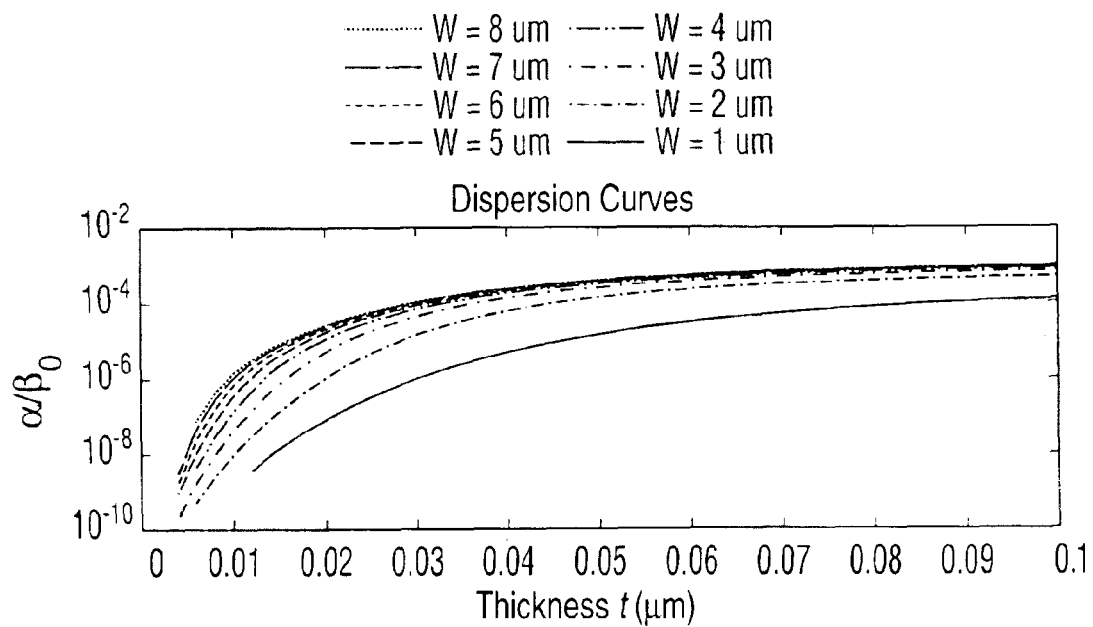

The modes supported by the symmetric waveguide strip are termed plasmon-polariton modes, for which, the fundamental mode is the $SS_b^0$ mode, see reference [5]. The dispersion characteristics with strip thickness and width of the fundamental symmetric $SS_b^0$ mode are shown in FIGS. 2(a) and 2(b) for a rectangular Au strip embedded in infinite $SiO_2$ ($\epsilon_{r,Au}=-131.9475-j12.65$, $\epsilon_{r,SiO2}=2.085136$) at a free-space wavelength of $\lambda_0=1550$ nm. FIG. 2(a) shows the normalized phase constant and FIG. 2(b), the normalized attenuation constant. The $SS_b^0$ mode possesses all six field components where the main transverse electric field component is the $E_\gamma$ component as long as the width of the waveguide is greater than the thickness. For a wide and sufficiently thin film (W~4 $\mu$m, t~20 nm), the main field components associated with this mode are the $E_\gamma$ and $H_x$ fields, thus the mode resembles a TEM (Transverse ElectroMagnetic) wave propagating along the film length. This mode is thus TEM-like in nature and not TM (Transverse Magnetic) as is the case for an interface between semi-infinite materials having positive and negative dielectric constants.

Transfer Matrix Method (TMM)

Figure 3:
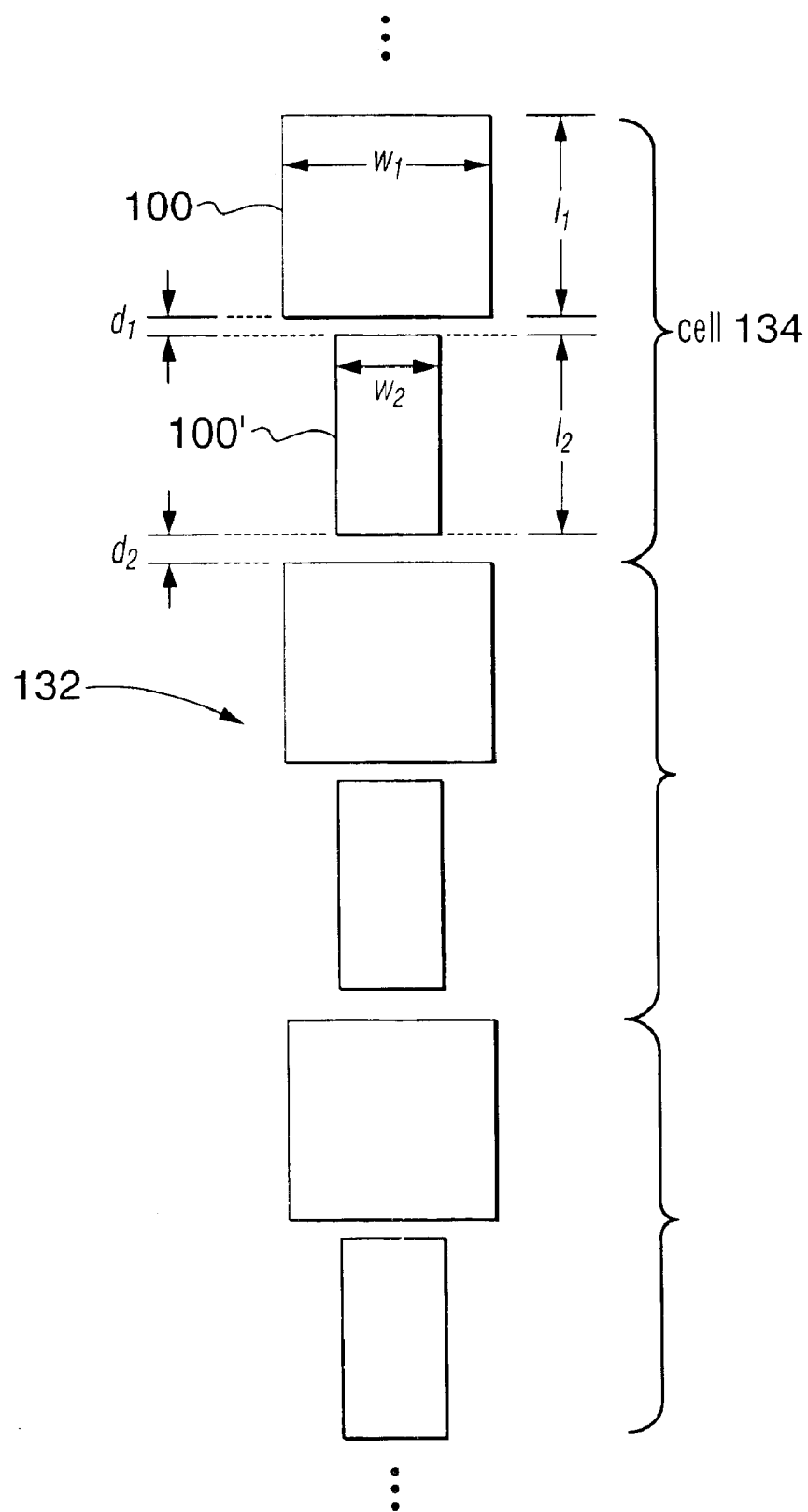
FIG. 3 is a plan view of a grating formed by a series of cells each comprising two waveguide sections having different widths and lengths.
Figures 4A, 4B:
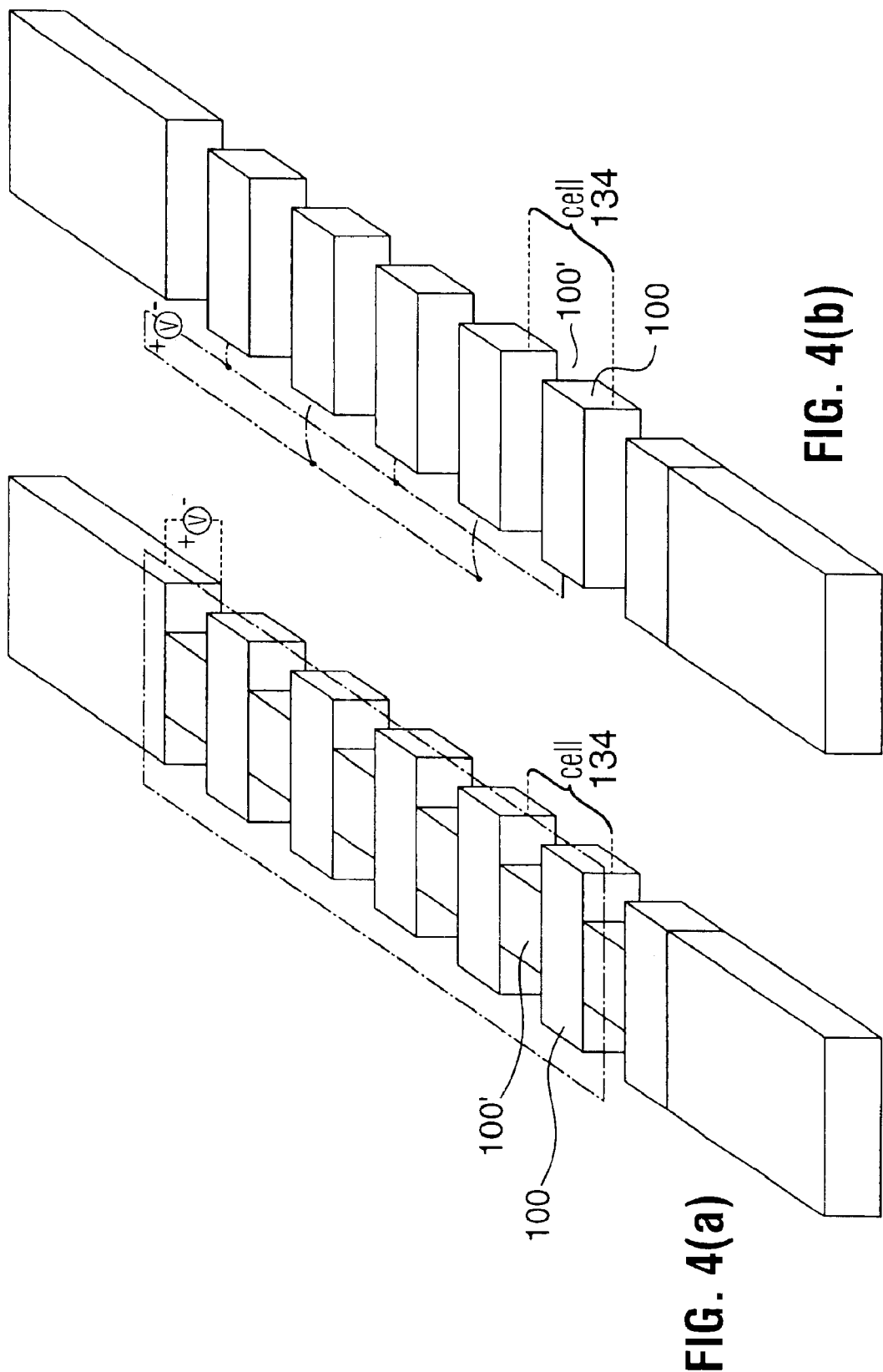
FIGS. 4(a) and 4(b) are pictorial views of typical gratings embodying this invention.

FIG. 3 is a schematic plan view of a plasmon-polariton filter or grating embodying this invention. FIG. 4(a) illustrates such a grating constructed by patterning a section of the metal waveguide strip, that is, varying its width, to create a perturbation of the mode effective refractive index over a certain length. The grating shown in FIG. 4(a) can also be constructed using two different metal strips, where the wider sections are Au and the narrow sections are Ag, for example.

FIG. 4(b) illustrates a second embodiment in which a series of metal strips of uniform width are spaced apart by narrow gaps of appropriate length along a certain section of waveguide to create a perturbation of the mode effective refractive index. The gaps are filled by either the surrounding dielectric material or another dielectric. In essence, from a theoretical perspective, in the grating of FIG. 4(b), the gaps constitute elements having zero width. The variation of the mode effective refractive index $\beta/\beta_0$ with respect to strip width for a particular strip thickness is clearly seen in the dispersion curves of FIG. 2(a) As the strip width increases from 1 $\mu$m to 8 $\mu$m, the attenuation and phase constants increase. The combination of two or more sections of strips with different widths, as in FIG. 4(a), or a combination of a metal strip with a short gap filled by a dielectric material, as in FIG. 4(b), will create a perturbation of the mode effective refractive index along the structure length. The patterned perturbations may take various forms, resulting in varying functionality, as will become apparent from the description of design architectures hereinafter.

Figure 5:
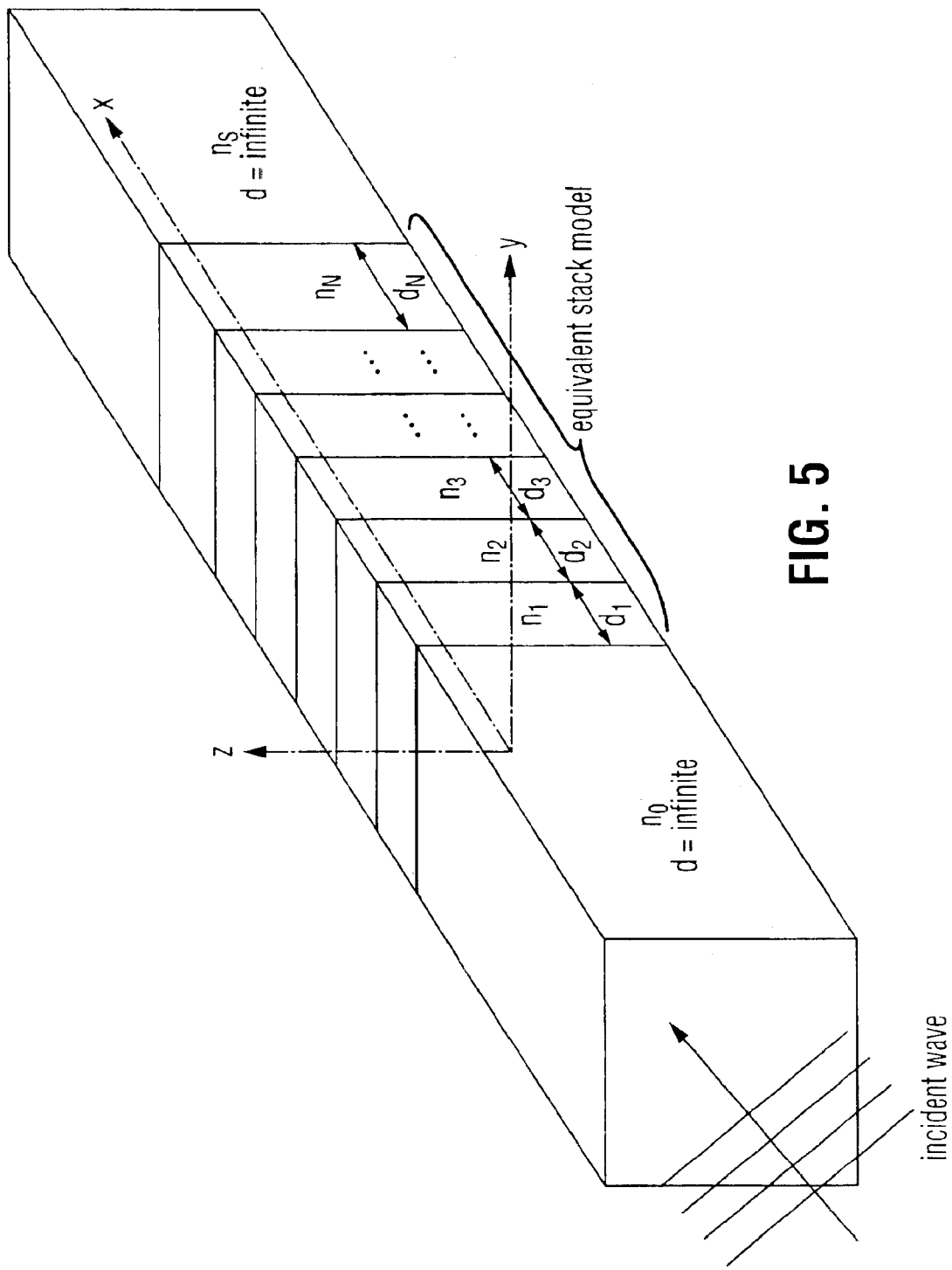
FIG. 5 illustrates an equivalent dielectric stack model used in simulating gratings embodying the present invention.

The reflectance of either of the gratings of FIGS. 4(a) and 4(b), or other gratings to be described hereafter, was found by applying a full-wave Transfer Matrix Method (TMM) approach. The formulation is based on Maxwell's equations and a detailed description of the approach is presented in reference [12]. It was preferred, in order to adapt the TMM approach, to model the embodiments of the present invention as an equivalent stack of thin dielectric slices, each slice corresponding to one of the grating elements, i.e. either a metal strip or a gap, as shown in FIG. 5. Each slice takes on the complex mode effective refractive index associated with the fundamental mode propagating in the corresponding waveguide section of the grating or, where the slice corresponds to a space (strip width and thickness equal to zero), the refractive index of the medium in the space. The complex effective refractive index of the fundamental mode supported by the waveguide is obtained using the MoL as detailed above. The complex effective index was defined as $\tilde{n}_{eff}=\beta/\beta_0-j\alpha/\beta_0$ where $\beta/\beta_0$ and $\alpha/\beta_0$ are the normalized phase and normalized attenuation constants, respectively, as obtained using the MoL and plotted in FIGS. 2(a) and 2(b) as a function of the strip width and thickness. The equivalent stack model adopted herein supports many modes, either a TE (Transverse Electric), a TM (Transverse Magnetic) or a TEM (Transverse ElectroMagnetic) mode. However, the fundamental $SS_b^0$ mode supported by the rectangular cross-section waveguide is TEM-like in nature as described above. A TEM mode is excited in the equivalent stack model when a plane wave is normally incident upon the stack along the +x-axis as shown in FIG. 5.

The H-field and E-field that satisfy Maxwell's equations in each layer m have the form, $$\vec{H} = \hat{y} H_{y_m}(x) e^{j\omega t} \quad (14)$$

$$\vec{E} = \hat{x} E_{x_m}(x) e^{j\omega t} + \hat{z} E_{z_m}(x) e^{j\omega t} \quad (15)$$

where m = 0, 1, ..., N,s. Using Maxwell's curl equations written in phasor form, we proceed to find the field distribution of the field components in each layer. We have, $$\nabla \times \vec{E} = -j\omega \mu_0 \mu_{r_m} \vec{H}_m \quad (16)$$

$$\nabla \times \vec{H} = j\omega \epsilon_0 \epsilon_{r_m} \vec{E}_m \quad (17)$$

Expanding the curl, we can solve for the field components in each layer using the general solutions of equations (14) and (15). Once the field components are known, we can relate the field amplitudes over each interface throughout the structure under consideration; this is achieved by ensuring that the tangential field components are continuous across each interface. The boundary conditions for the tangential field components between two adjacent slices are, $$\hat{n} \times (\vec{E}_{m+1} - \vec{E}_m) = 0 \quad (18)$$

$$\hat{n} \times (\vec{H}_{m+1} - \vec{H}_m) = 0 \quad (19)$$

Applying the tangential field boundary conditions at each interface in the dielectric stack allows us to relate the amplitude of the electric field at the input to the amplitude of the electric field at the output of the stack. From the application of the boundary conditions, the electric field amplitudes are related by $$\begin{bmatrix} E_0^i \\ E_0^r \end{bmatrix} = M \begin{bmatrix} E_s^i \\ E_s^r \end{bmatrix} \quad (20)$$

where M is a 2×2 matrix given by $$M = \begin{bmatrix} M_{11} & M_{12} \\ M_{21} & M_{22} \end{bmatrix} = D_0^{-1} \left[ \prod_{i=1}^{N} D_i P_i D_i^{-1} \right] D_s \quad (21)$$

where N is the number of layers in the stack, D are called dynamical matrices for the TM wave in each layer and are given by $$D_i = \begin{bmatrix} 1 & 1 \\ n_i & -n_i \end{bmatrix}$$

for normal incidence, P is the propagation matrix through the bulk of a slice of the stack and is given by $$P = \begin{bmatrix} e^{jdk_{x_i}} & 0 \\ 0 & e^{-jdk_{x_i}} \end{bmatrix}$$

where d is the length of the slice and $$k_{x_i} = \frac{\omega}{c_0} \tilde{n}_i$$

is the propagation constant along the x-axis in each slice.

The TMM approach disclosed above sequentially calculates the amplitude of the reflected E-field at each interface, between two different dielectric slices, throughout the entire equivalent dielectric stack model of the grating to obtain the input reflectance. The reflectance, r, is defined as the ratio of the magnitude of the reflected to incident E-field, and is given by, $$r = \frac{|E_r|}{|E_i|} = \frac{E_0^r}{E_0^i} = \sqrt{R} \, e^{j\phi} \quad (22)$$

where R is the intensity reflectance and $\phi$ is the phase shift of the grating structure.

An alternative formulation for the special case of uniform periodic grating structures is based on a Bloch-Wave formulation. The Bloch theorem exploits the periodicity of the structure to simplify the formulation through the introduction of a Bloch wave number, K. For a detailed description of the application of the Bloch theorem see reference [12]. The theorem allows the introduction of an eigenvalue solution to simplify the formulation of relating the amplitude of the electric field at the input of the stack to the amplitude of the electric field at the output of the stack model. In this situation, the reflectance is given by, $$|r_N|^2 = \frac{|C|^2}{|C|^2 + \left(\frac{\sin K\Lambda}{\sin NK\Lambda}\right)^2} \quad (23)$$

where the unimodular matrix that relates the input and output electric field amplitudes is defined as, $$M = \begin{bmatrix} A & B \\ C & D \end{bmatrix} = \begin{bmatrix} AU_{N-1} - U_{N-2} & BU_{N-1} \\ CU_{N-1} & DU_{N-1} - U_{N-2} \end{bmatrix} \quad (24)$$

where $U_N = \frac{\sin(N+1)K\Lambda}{\sin K\Lambda}$.

The group delay is another important performance characteristic of gratings. The group delay $\tau$ of an input signal reflected by the plasmon-polariton grating structure is defined as:

$$\tau = -\frac{\lambda_0^2}{2\pi c_0} \frac{\partial \phi}{\partial \lambda_0} \quad (25)$$

where $\phi$ is obtained from the reflectance of the structure and $c_0$ and $\lambda_0$ are the free space speed of light and wavelength, respectively. The group delay is obtained by applying finite-difference formulae of $O(h^4)$. This allows the numerical calculation of the derivative given discrete data points.

Design Architectures

It should be appreciated that the term "cell" should not be interpreted to mean that the gratings disclosed herein necessarily are constructed from cells that are identical. In some gratings embodying the invention, the "cells" differ from one another.

Uniform Periodic Gratings

The perturbation of the mode effective refractive index described above can be periodic and constant along the grating length. In this case, referring to FIG. 3, the grating 132 may be considered as a periodic perturbation comprising a series of cells 134, each comprising two rectangular waveguides 100 and 100' having different lengths $l_1$ and $l_2$ and widths $w_1$ and $w_2$, respectively. This cell 134 is then repeated N times to create the grating The dimensions of the waveguides in each cell 134, the spacing $d_1$ therebetween, the number of cells, and the spacing $d_2$ between cells are adjusted such that reflection occurs at a desired operating wavelength or over a desired operating bandwidth for an optical signal propagating along the grating axis, i.e. along the longitudinal axis of the array of cells 134. The period of the periodic grating is given by $\Lambda_0 = l_1 + d_1 + l_2 + d_2$.

The center free space reflection wavelength of the grating is found using $$\lambda_0 = 2n_{ave}\Lambda_0 \tag{26}$$

where $$n_{ave} = \frac{n_{100} l_{100} + n_{100'} l_{100'}}{\Lambda_0}$$

is the average effective refractive index of the fundamental mode supported in each of the waveguide sections 100 and 100', $n_{100}$ and $n_{100'}$ are the effective refractive indices of the $SS_b^0$ mode supported by sections 100 and 100' respectively, $l_{100}$ and $l_{100'}$ are the lengths of the sections 100 and 100' respectively, and $\Lambda_0$ is the fundamental period of the grating as defined above. For a fixed average effective refractive index, determined by the selection of the strip widths in the cell 134, the choice of the fundamental period will determine the reflection center wavelength. Design rules for the selection of appropriate lengths, $l_1$ and $l_2$, of the waveguides 100 and 100' respectively, include:

(1.) Quarter-wave dimensions where the lengths, $l_1$ and $l_2$, are defined as $$l_1 = \frac{\lambda_0}{4n_{100}}$$

and $$l_2 = \frac{\lambda_0}{4n_{100'}}$$

where $\lambda_0$ is the center wavelength;

(2.) Application of an algorithm, such as disclosed in reference [13], to find optimization parameters $\beta_{opt}$ and $l_{opt}$ for in the case of two lossy waveguide sections. This algorithm selects the lengths to maximize the intensity reflectance of the cell at the desired center wavelength. The lengths are then set to $l_1 = \beta_{opt} l_{opt}$ and $l_2 = (1-\beta_{opt}) l_{opt}$.

Figure 6A:
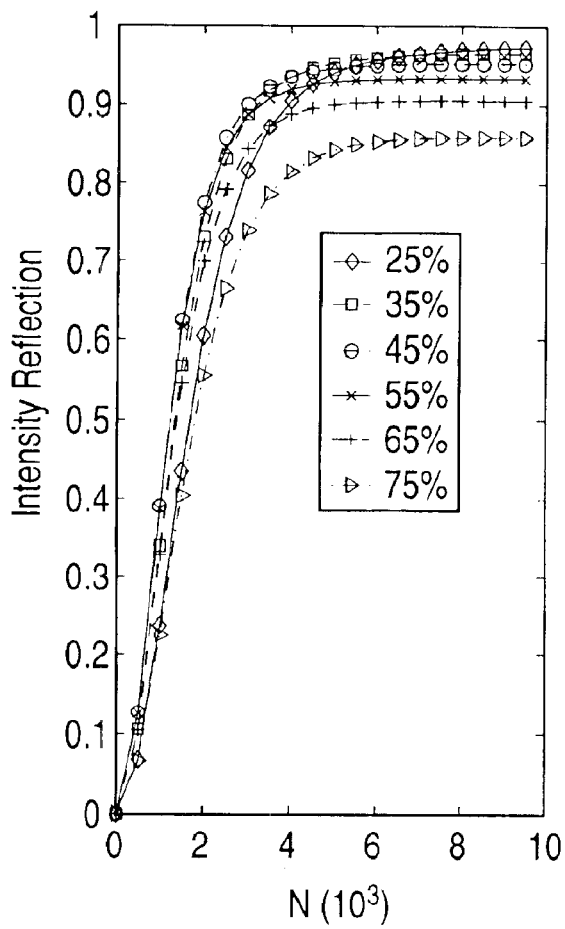
FIGS. 6(a), and 6(b) illustrate the effects of the duty cycle on the spectral characteristics of a uniform periodic grating. The duty cycle is the fraction of the metal strip length to the period length.
Figure 6B:
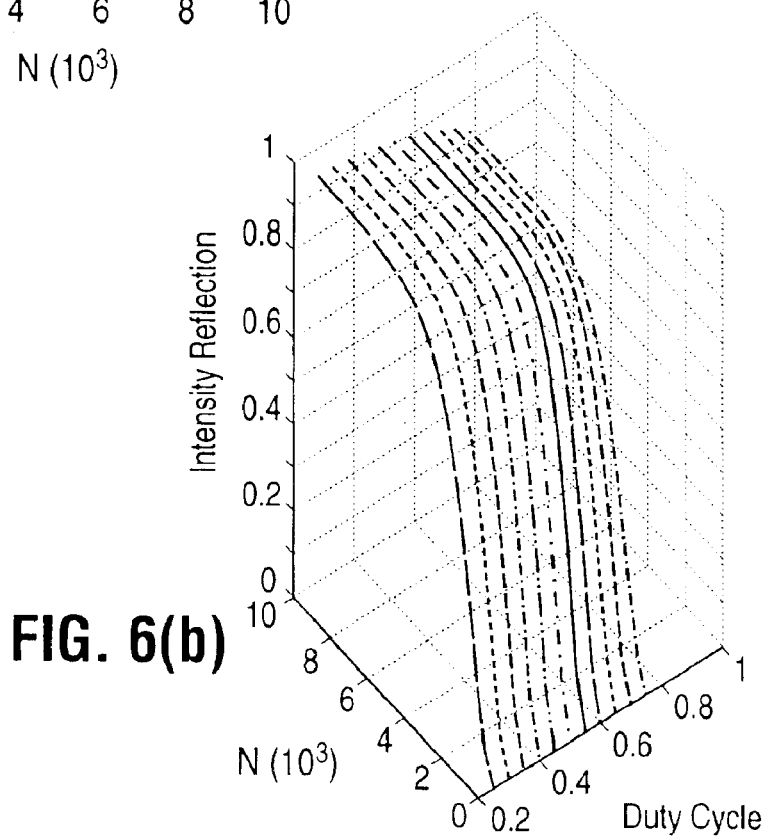

(3.) Application of a duty cycle. For a fixed fundamental period $\Lambda_0$, the cell subsection lengths $l_1$ and $l_2$, are varied and design plots of Intensity reflectance with respect to grating length generated to provide design guidelines for dimension selection. The duty cycle is defined as the fraction of the metal strip length of waveguide 100 to the period length. The duty cycle values of interest are limited by the minimum feature size of the targeted fabrication process. For illustration, consider a uniform periodic grating composed of a series of cells comprising a 8 μm wide Au strip, 20 nm thick, and a gap filled by the background dielectric, $SiO_2$. The fundamental period was set to 0.536 μm. FIGS. 6(a) and 6(b) show 2-D and 3-D plots respectively of the variation of the intensity reflectance with grating length and duty cycle. From these plots, it is clear that a tradeoff exists between grating length and duty cycle for maximum reflectance. The center wavelength can be found using equation (26).

In the literature, the quarter-wave dimension and the 50% duty cycle cases are the most commonly used cell dimension definitions.

Figure 7:
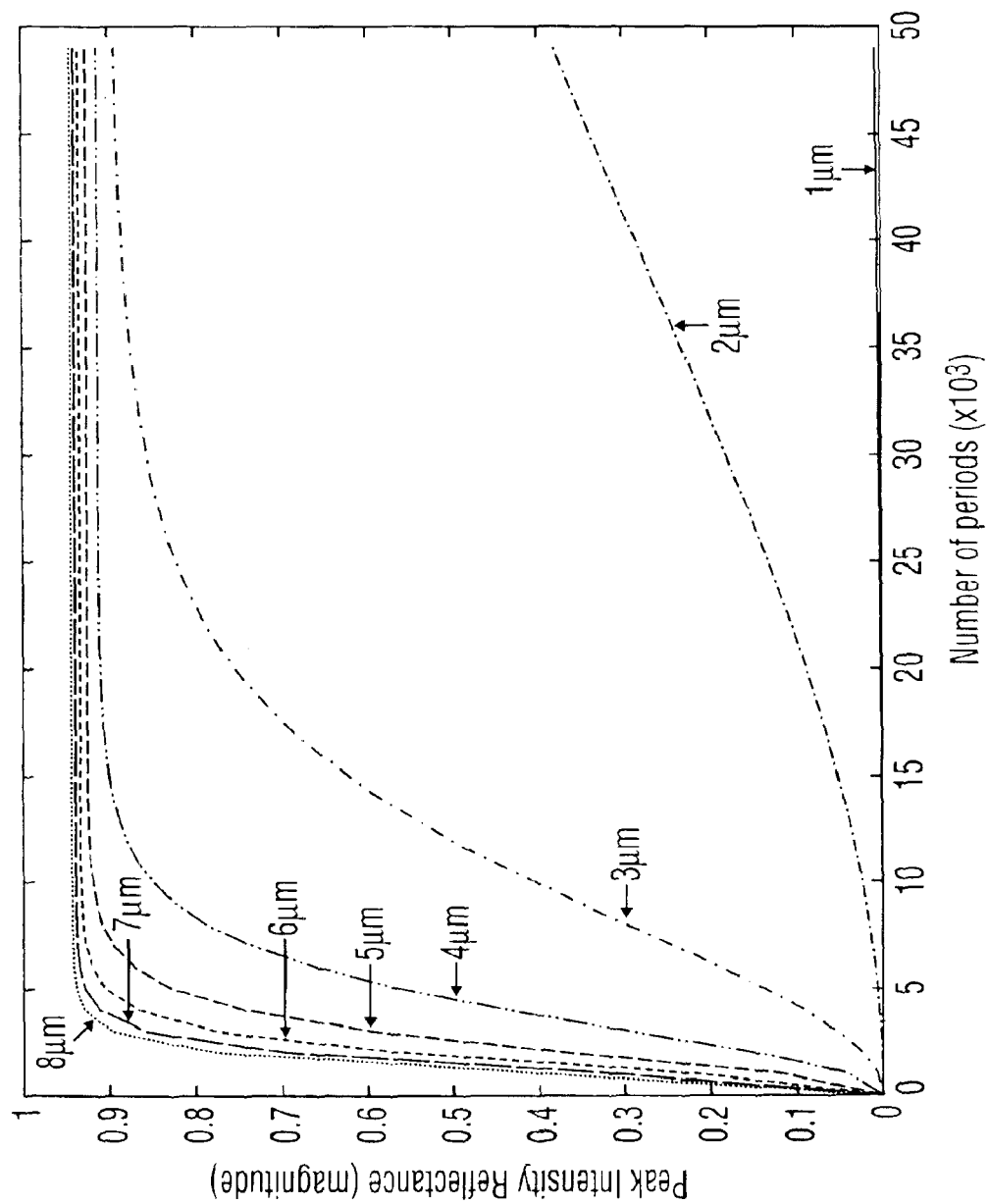
FIG. 7 illustrates the variation of the magnitude of the Intensity Reflection with N, the number of periods, for uniform periodic embodiments of the present invention.

The length L of the grating or N, the number of periods, is another design constraint. FIG. 7 shows the variation of the intensity reflectance with N, the number of periods of the grating for a grating of the kind shown in FIG. 4(b). The grating length and the number of periods are related through the fundamental period as $L = N\Lambda_0$. The performance shown in FIG. 7 is for periodic uniform plasmon-polariton gratings with 50% duty cycle and period $\Lambda_0 = 0.536$ μm. The spacings $d_1$ and $d_2$ in FIG. 3 are set to zero. The width of waveguide 100 was varied from an 8 μm wide Au strip to a 1 μm wide Au strip in increments of 1 μm, waveguide 100' is taken to be a gap filled by the background dielectric, $SiO_2$. The results show that an optimal length exists for each configuration, after which no additional reflectance is gained. From FIG. 7, when the width of section 100 is set to an 8 μm wide strip, the optimal number of periods is $N \cong 5000$, which corresponds to a grating length of 2.68 mm. The existence of this optimal grating length is due to the losses that are present in the metal strip.

The bandwidth of a grating $\Delta\lambda$ is controlled by the width of the band-gap of the structure. In the case of a uniform periodic structure, the bandwidth is controlled by the effective refractive indices associated with the waveguide sections 100 and 100' of the cell 134 and is defined as $$\Delta\lambda = 2\left[\frac{\pi\lambda_0}{4\sin^{-1}\left(\frac{\Delta n}{2n_{ave}}\right)} \pm \sqrt{\left(\frac{\pi\lambda_0}{4\sin^{-1}\left(\frac{\Delta n}{2n_{ave}}\right)}\right)^2 - \lambda_0^2}\right] \tag{27}$$

where $\lambda_0$ is the center wavelength, $n_{ave}$ is the average effective refractive index and $\Delta n = |n_{100} - n_{100'}|$ is the modulation depth. Manipulation of the bandwidth thus requires a modification of the average effective refractive index of a cell. Techniques for the manipulation of the bandwidth will be described later in this disclosure.

Non-Periodic or Chirped Gratings

The dimensions of the elements 100, 100' in each cell 134 can also be made to change along the direction of the structure in order to implement a non-periodic perturbation of the mode effective refractive index over the grating length. The non-periodic perturbation can be a linear, quadratic or other function of position along the grating length. The grating is built from a cascade of N cells 134, were any of the parameters $w_1, w_2, d_1, l_1, d_2, l_2$ can vary between each adjacent cell. This creates a non-periodic or chirped grating design. The choice of the widths in 134 will determine the depth of modulation. The lengths and spacing of the cells will determine the center wavelength from equation (26). The lengths can be determined using the procedure defined above.

Chirped grating designs are inherently non-reciprocal due to the presence of losses in the waveguide sections. Since the reflection of longer wavelengths requires longer cell lengths, the long-wavelength reflecting sections are slightly lossier than the short-wavelength reflecting sections. Also, if the long-wavelength reflecting section is placed near the end of the grating, the propagation losses seen by the long-wavelength signals as they propagate through the entire structure result in a greater attenuation, compared to the short-wavelength signals, which are reflected near the input. The ordering of the cell cascade becomes important to equalize the attenuation over all wavelengths.

Step-Chirped Gratings

A step-chirped design is composed of the cascade connection of M different grating sections, each section being comprised of a uniform grating. The period of the uniform section varies from section to section to implement a desired chirping function. The utility of this design is to increase the reflectance created at each center wavelength defined by each uniform section.

Mirror Interleave of Non-Periodic or Chirped Gratings

The non-reciprocal nature of chirped designs can be mitigated via interleaving. A mirror interleave is the process by which two gratings that are transposed longitudinally with respect to each other, Grating A and Grating B, each composed of cells of the form 134, referred hereafter as 134A and 134B for Grating A and Grating B respectively, are combined in an alternating cell by cell approach. That is, a new grating is created by taking the first cell 134A and cascading it with the first cell 134B, followed by the second cell 134A, and then the second cell 134B and so forth until all cells have been combined. The result is a quasi-reciprocal non-periodic grating design with improved spectral characteristics over the traditional chirped grating definitions in the presence of waveguide losses. See the preferred embodiments below for a detailed example.

Interleaved Gratings

The concept of cell by cell interleaving can be applied to any of the design architectures disclosed herein. The interleaving is done as disclosed in the section captioned "Mirror interleave of non-periodic or chirp gratings", but no mirror or transposition is applied to the gratings. This cell by cell interleave creates a new grating with a super-cell composed of the concatenation of one cell 134 of each original grating. The interleaving concept is not limited to the combination of two gratings; M gratings can be interleaved cell by cell in the manner outlined. The resulting super-cell is composed of a minimum of 4 sections. The average effective refractive index of the super-cell is approximately equal to the weighted average of the average effective refractive indices of the individual cells or the weighted average of the effective refractive indices of the waveguide sections.

Interleaving allows the positioning of the center reflection wavelength of the resulting grating in the spectrum, since a new average effective refractive index and fundamental period are obtained, and through equation (26),$\lambda_0$ is subsequently modified. A shifting of the reflection spectrum is achieved by interleaving designs with different center wavelengths (that is, different dimensions $l_1$, and $l_2$). For example, using a 1 nm resolution on the cell dimensions, a grating was successfully centered at 1550 nm using super-cells each having 14-slices.

The bandwidth of an interleave can be modified through the selection of the widths w composing the super-cell. Let us consider a super-cell of 4 slices (interleave of 2 gratings). For maximum reflectance, the modulation depth must be maximized between two slices. From the curves presented in FIG. 7, maximum reflectance is obtained for the cell 134 construction composed of a 8 µm wide Au strip 20 nm thick and a gap, where $d_1=d_2=0$ and 50% duty cycle. The parameters, d, l and w, of the remaining 2 slices are selected to fulfill a center wavelength and bandwidth requirement, as the choice of the widths, $w_3$ and $w_4$, and lengths, $l_3$ and $l_4$, referring to equations (26) and (27) affects the center wavelength and bandwidth via the average effective refractive index and grating period definitions. If the lengths are constant throughout the four slices, $l_1=l_2=l_3=l_4$, from equation (26), selecting $(w_3, w_4)<(w_1, w_2)$ will introduce a displacement in the center wavelength.

Higher Order Architectures

The device architectures described above were detailed considering only first order designs. The methodologies are not limited, however, to the design of first order embodiments. The center wavelength of higher order embodiments is found from:

$$\lambda_0 = \frac{2 n_{ave} \Lambda_0}{N} \quad (28)$$

where N is an integer, greater than or equal to 1, that indicates the order of the grating period, $\Lambda_0$. For the same center wavelength and average effective refractive index, a higher order design is marked by a larger fundamental period since N>1. Using equation (28) with any of the above disclosed design architectures, second, third or higher order gratings can easily be designed into this plasmon-polariton grating technology.

The primary spectral characteristics of interest are the reflectance, the sidelobe suppression level, the bandwidth, the center wavelength and the group delay. The center wavelength and reflectance are manipulated according to the design schemes described above. Other design rules, detailed herein, permit further control of the bandwidth and sidelobe suppression.

Suppression of Sidelobe Levels

The traditional method for sidelobe suppression is apodization of the structure. The goal of apodization is to slowly vary the depth of modulation along the grating length, gradually increasing the coupling from the input and output of the grating, while keeping the average effective refractive index constant. This ensures that the center wavelength remains unchanged. Apodization functions found in the art can be applied to the invention to modify the bandwidth and sidelobe levels.

An apodization is obtained, referring to FIG. 3 grating 132, by varying the widths $w_1$ and $w_2$ of the waveguides 100 and 100' to describe the slowly varying modulation depth. For example, $w_1$ would slowly increase while $w_2$ would slowly decrease from a nominal width along the grating length. This creates a width contour or envelope along the grating length. In this scheme, the lengths of the waveguides are unchanged and hence the period is constant. This procedure requires that the cell 134 be constructed from two waveguide sections, that is, a gap cannot be used for either 100 or 100'. The apodized section created is then lossy. As these sections yield little reflection, they act as an absorber or attenuator at the input and output ends of the grating, decreasing the maximum reflectance possible. An alternative would be to use the background material for one partition of the cell 134. As the background is a lossless dielectric, this will reduce the absorption of the apodized sections and increase the maximum reflectance possible from the grating. This procedure requires fixing $n_{100'}$ to the background refractive index while $n_{100}$ is varied to implement the variation of the modulation depth. The offset in the center wavelength perturbation is then compensated by slowly chirping the lengths $l_1$ and $l_2$ of the apodized section at a rate comparable to the modulation depth to ensure that equation (26) remains constant. This procedure can also be applied in the case of a two waveguide cell definition. In this case the waveguide with the smallest width would be held constant while the other waveguide width varies and a chirp is applied to both dimensions i.e. the width and length.

Figure 10A:
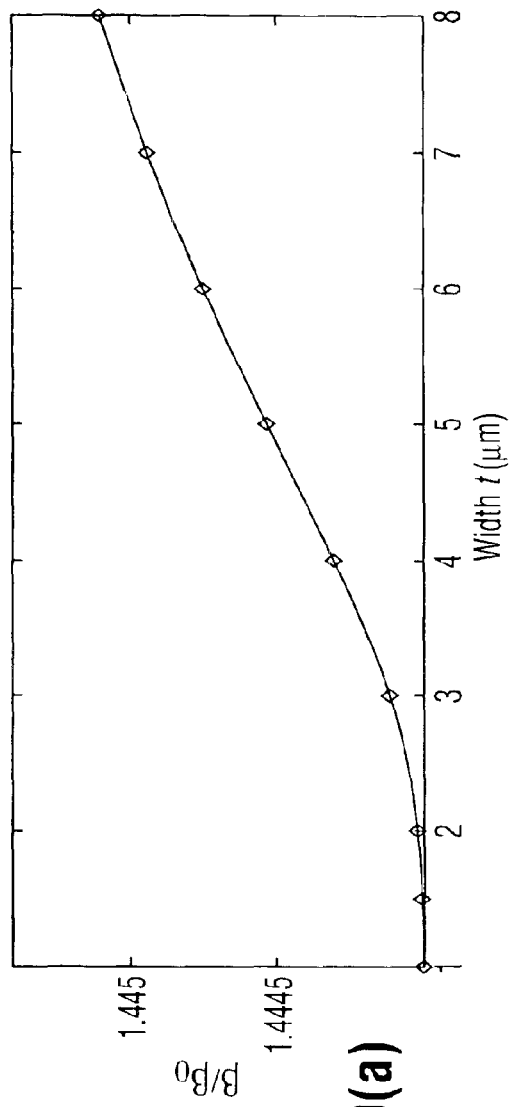
FIGS. 10(a) and 10(b) illustrate a cubic-spline interpolation of the dispersion characteristics with waveguide width for a rectangular cross-section waveguide.
Figure 10B:
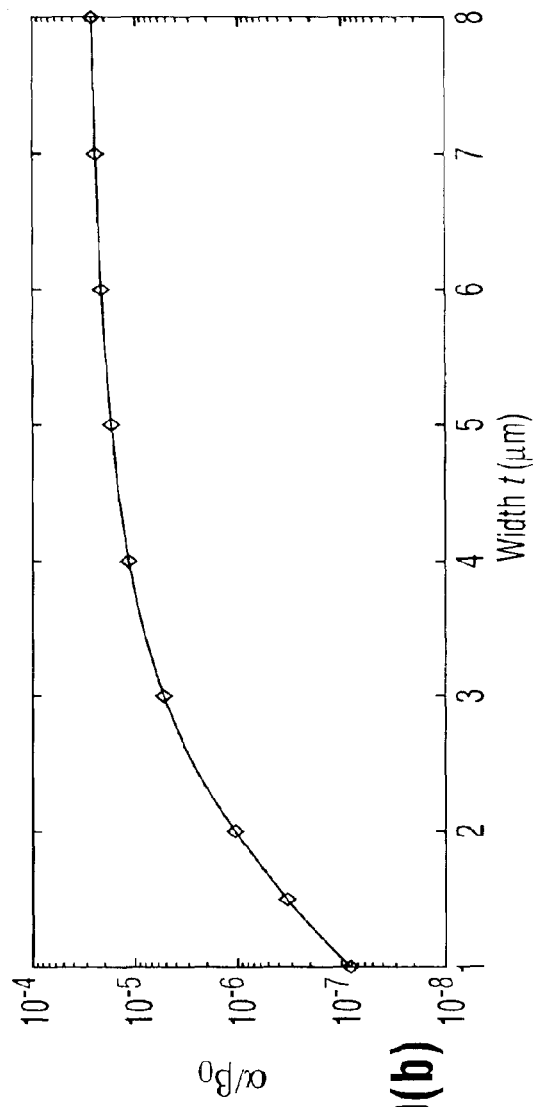

The apodization of gratings embodying this invention is dependent on possessing the geometrical dispersion characteristics for a large number of waveguide widths with small incremental differences. It is impractical to find the modal solutions of a large number of waveguide widths so a cubic-spline interpolant of the geometrical dispersion characteristics of the symmetrical waveguide, as shown in FIG. 2, is constructed. The interpolant of the normalized phase constant for a Au strip thickness of 20 nm is plotted in FIG. 10(a), and the interpolant of the normalized attenuation constant is plotted in FIG. 10(b). The diamond data points refer to the modal solution values; the curve is the result of the spline interpolation. This provides the required geometrical dispersion information for any desired width.

Bandwidth

The bandwidth of a grating is directly related to the band-gap of the periodic structure through the refractive indices of the sections, as shown in equation (27). In order to modify the bandwidth, a change in the average effective refractive index, $n_{ave}$, and/or the depth of modulation, $\Delta n$, must occur. Both parameters are dependent on the refractive indices of the cells, but the average effective refractive index is also dependent on the dimensions of the cell as it is a weighted average. The bandwidth can be reduced by increasing the modulation depth and/or decreasing the average effective index, and vice-versa. This effect can be achieved by apodization if an appropriate trade-off between absorption and reduced reflectance is found. An easier scheme for bandwidth control is interleaving. This concept has already been disclosed in the previous subsections. It can be extended to any grating scheme to create a super-cell where the nominal bandwidth can increase or decrease according to the super-cell construction since $n_{ave}$ is perturbed.

Center Wavelength

The center wavelength of a grating design can be manipulated, according to equation (26), by a variation in the average effective refractive index or the grating period. For a given design, the choice of the widths and lengths of the waveguides 100 and 100' will determine the center wavelength $\lambda_0$. To shift the location of $\lambda_0$ using cells comprised of equal length sections, an interleave with a second cell also comprised of equal length sections will cause a perturbation in the average effective index while keeping the grating period constant, resulting in a shift in the location of $\lambda_0$. An interleave with a second cell of varying widths and lengths, will cause a perturbation in both the average effective index and the grating period, resulting in a more substantial tuning of $\lambda_0$.

In all of the above design methodologies, it should be noted that the waveguides 100, 100' in each cell need not be rectangular, but a variety of other shapes could be used. For example, FIG. 8 illustrates a portion, specifically two cells 138, of an alternative periodic structure 136 in which each cell 138 comprises two of the trapezoidal waveguide sections 106, 106' with their wider edges opposed. It should be noted that these periodic structures, shown in FIGS. 3 and 8, are merely examples and not intended to provide an exhaustive detailing of all possibilities; various other periodic structures could be formed from cells comprised of all sorts of different shapes and sizes of elements.

Substantially Square Waveguide Strips

The above device architectures can also be implemented using a plasmon-polariton waveguide structure having a substantially square cross-section strip that is finite in width, as is disclosed in co-pending United States Provisional patent application (Agent's docket No. AP877) filed Jun. 22, 2001. The substantially square waveguide structure, shown in FIG. 9(a), can be used to construct a new series of plasmon-polariton gratings composed of a metal film of thickness t, width w, where t is substantially equal to w, and equivalent permittivity $\epsilon_2$, surrounded by a cladding or background comprising an infinite homogeneous dielectric of permittivity $\epsilon_1$. Suitable materials for the waveguide strip include, but are not limited to, gold, silver, copper, aluminum, and highly- or p-doped GaAs, InP or Si, while suitable materials for the surrounding material include, but are not limited to, glass, quartz, polymer and undoped or very lightly doped GaAs, InP or Si. Particularly suitable combinations of materials include Au for the strip and $SiO_2$ for the surrounding material. The basic structure of the gratings based on this substantially square waveguide is shown in FIG. 9(b), which shows a grating 132C comprising a series of cells 134C, each comprising two substantially square waveguides 100C and 100C' having different lengths $l_1$ and $l_2$ and substantially equal widths $w_1$ and $w_2$, respectively. This cell 134C is then repeated N times, as shown, to create the grating 132C. The dimensions of the waveguides in each cell 134C, the spacing $d_1$ therebetween, the number of cells, and the spacing $d_2$ between cells are adjusted such that reflection occurs at a desired operating wavelength or over a desired operating bandwidth for an optical signal propagating along the grating axis, i.e. along the longitudinal axis of the array of cells 134C. A perturbation of the mode effective refractive index can be established in at least two fashions in the grating 132C shown in FIG. 9(b). For illustration, let us consider a uniform periodic grating, where the cell 134C is composed of two substantially square waveguides of differing metals, one of Au and one of Ag for example, in order to establish a perturbation of the mode effective refractive index. Alternatively, each cell 134C can be composed of a substantially square waveguide 100C and a gap, being filled by the background dielectric or another dielectric, instead of waveguide 100C', where the length of the gap is adjusted for a desired operating wavelength.

Tunability

It should also be noted that adjusting means may be provided for modifying an optical response of any of the gratings disclosed herein. For example, voltages can be applied to some or all of the strips in order to establish charges on the strips of the cells, which would change their permittivity and thus vary the optical transfer function of the structures of the device architectures disclosed above. Where the grating structure is as shown in FIG. 4(a), for example, at least one electrode may be disposed alongside the grating and extending along at least a part of its length, as shown in broken lines in FIG. 4(a). The electrode would be connected to one terminal of a voltage source and a second terminal of the voltage source would be connected to at least one of the strips. The distance between the electrode and the grating would be great enough to ensure that optical coupling did not occur therebetween, while small enough to ensure sufficient field strength to effect the required modification of the response. If the dielectric material surrounding the strip were electro-optic, then the applied voltages would also change the permittivity of the dielectric, which also contributes to changing of the optical transfer function for a given design architecture. Where the grating has the structure shown in FIG. 4(b), the adjusting means may comprise a voltage source V having one terminal connected to alternate ones of the waveguide strips and its other terminal connected to the intervening waveguide strips, as shown in broken lines in FIG. 4(b). For further information about techniques for tuning the waveguide structures 100 used in embodiments of the present invention, the reader is directed to the afore-mentioned International patent application number PCT/CA00/01525.

A two-dimensional photonic bandgap structure can be created by placing two or more of the periodic structures side-by-side to form a two-dimensional array of unit cells (comprised of strips of various shapes and sizes). A three-dimensional array can be created by stacking a plurality of such two-dimensional arrays in numerous planes separated by dielectric material. The size and shape of the strips are determined such that stop bands in the optical spectrum appear at desired spectral locations.

EXAMPLES OF PREFERRED EMBODIMENTS

Unless otherwise stated, when structure dimensions are mentioned from this point onward, they refer to the Au/SiO$_2$ material combination, where the thickness of the Au strip is 20 nm and the operating optical free-space wavelength is 1550 nm. The examples are of first order embodiments only. Dimensions and specification for higher order embodiments can be obtained by applying equation (28) to the same configurations disclosed. Similar dimensions are needed for most material combinations.

The plasmon-polariton field may be excited by optical radiation coupled to the strip in an end-fire manner from a fiber butt-coupled to the input of the waveguide. The output of the waveguide can also be butt-coupled to a fiber.

Example 1

Uniform Grating

Figure 11:
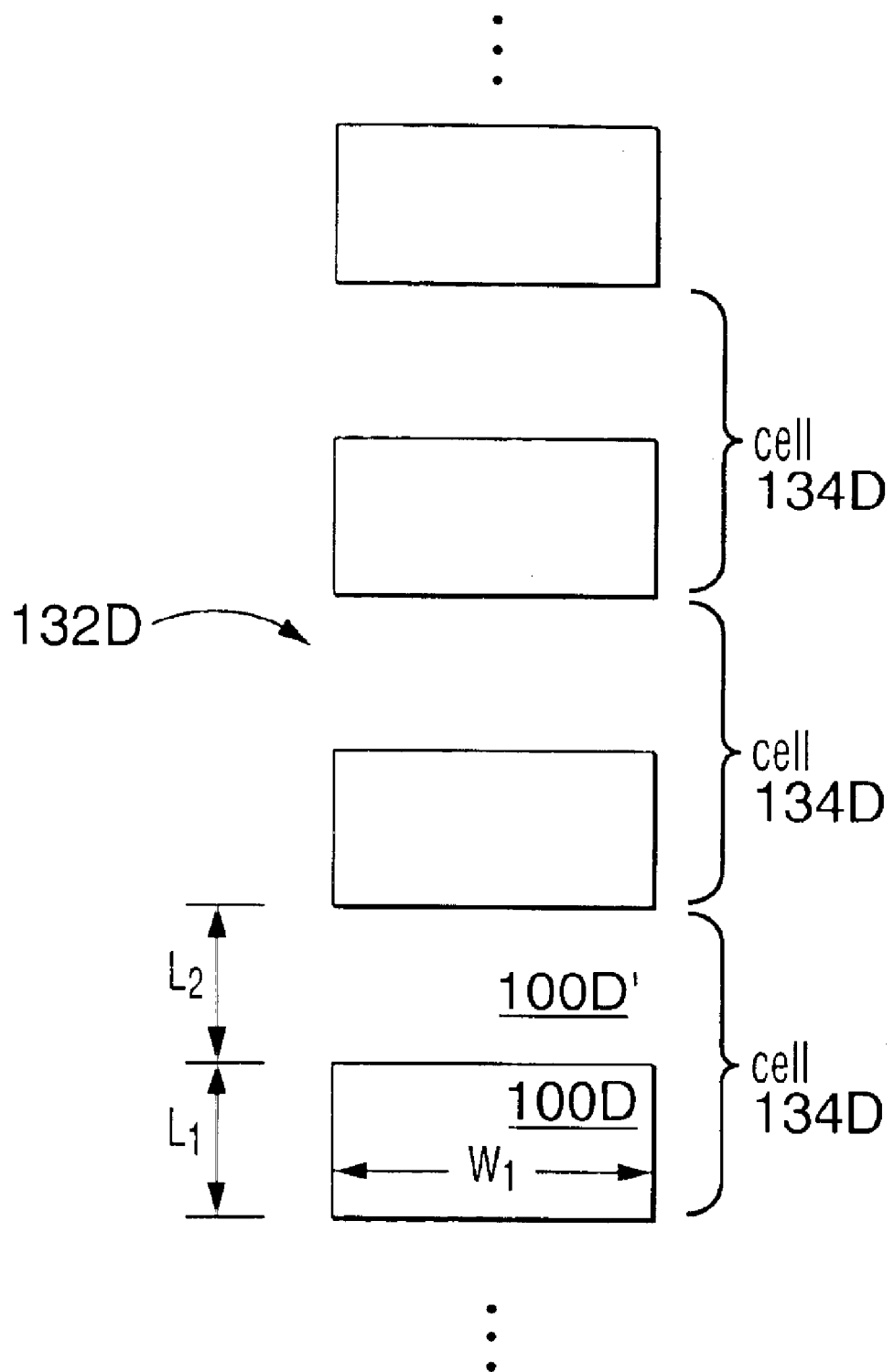
FIG. 11 is a plan view of a uniform periodic grating formed by a series of cells each comprising two sections; a metal strip and a gap.
Figure 12A:
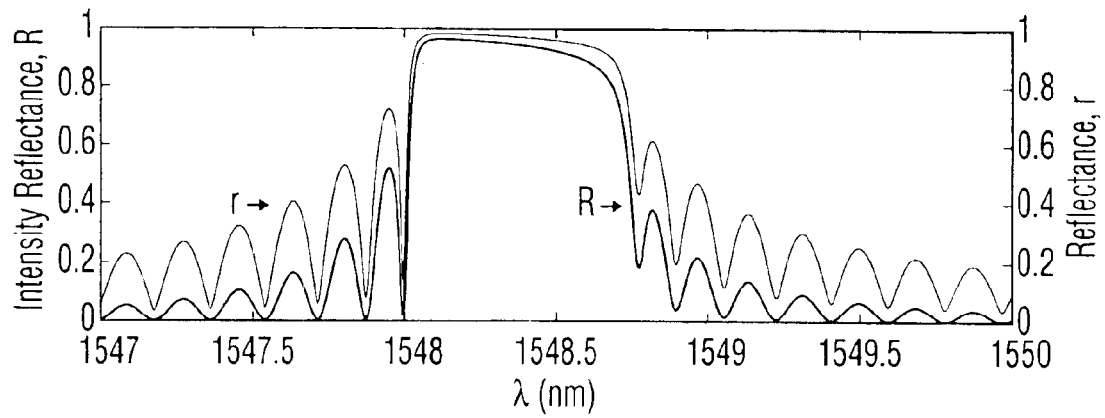
FIGS. 12(a), 12(b) and 12(c) illustrate the spectral response and group delay for a uniform periodic grating of the present invention.
Figure 12B:
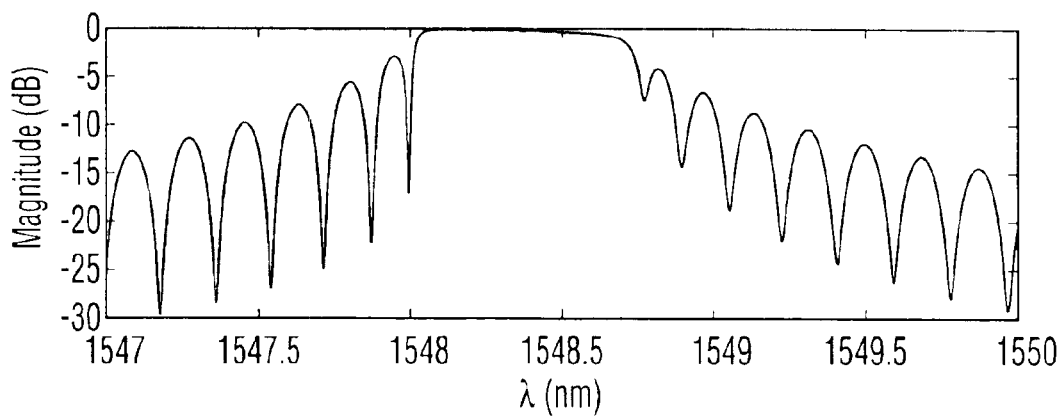
Figure 12C:
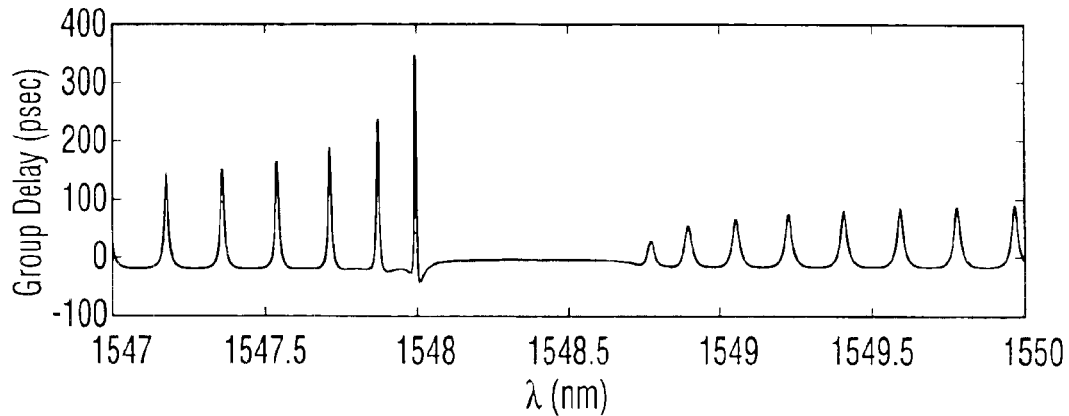

FIG. 11 illustrate s an example of a uniform periodic grating embodying this invention. Grating 132D comprising a series of cells 134D composed of two waveguide sections, 100D and 100D', that take the form of an 8 μm wide strip 100D and a gap 100D' filled by the background dielectric, respectively, in this instance. The lengths of both sections are selected for a 35% duty cycle and a 1 nm feature resolution where the period Λ of the grating is 0,536 μm. FIGS. 12(a), 12(b) and 12(c) illustrate the spectral performance of this embodiment for a device length of 4.288 mm. FIGS. 12(a) and 12(b) display the reflectance, linear and logarithmic, of the device, respectively. The uniform period embodiment yields a maximum intensity reflectance of 96.4%, with a 0.7 nm approximate bandwidth for a center wavelength of 1548.38 nm. FIG. 12(c) displays the group delay in picoseconds of the uniform grating 132D over the useful bandwidth of the grating. As shown in FIG. 12(c), the group delay is relatively flat over the useful reflection bandwidth of the grating 132D.

Example 2

Uniform Apodized Grating

Figure 13A:
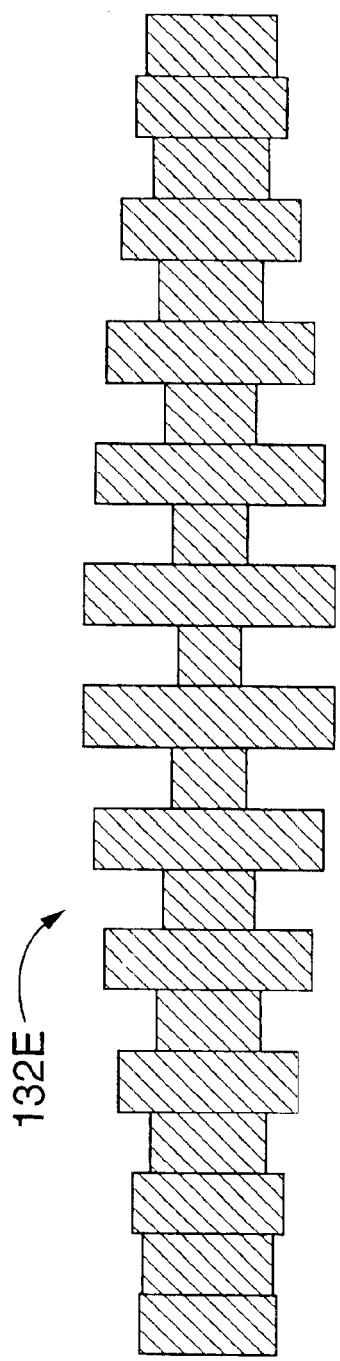
FIGS. 13(a) and 13(b) are plan views of an apodized-uniform and unapodized periodic grating respectively formed by a series of cells each comprising two waveguide sections having different widths and lengths.
Figure 13B:
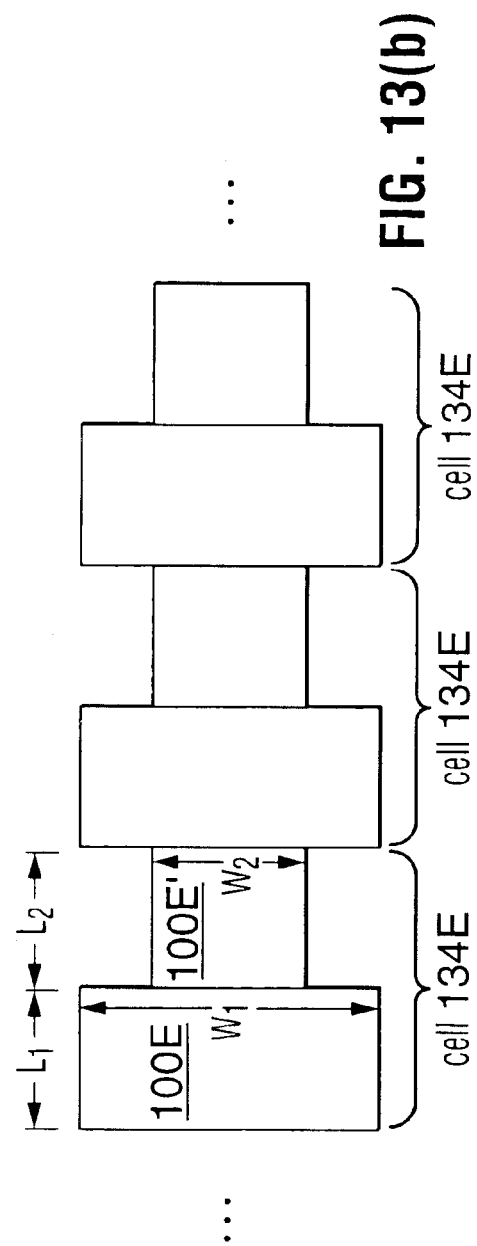

FIGS. 13(a) and 13(b) illustrate an example of an apodized uniformly periodic grating 132E embodying this invention. It is composed of a series of cells 134E each composed of two waveguide sections, 100E and 100E'. As shown in FIG. 13(a), the contour of the grating follows a predefined apodization function which varies the widths of the waveguide sections 100E and 100E' as compared to a unapodized cell 134E shown in FIG. 13(b), that takes the form of an 8 μm wide strip and a 1 μm wide strip, respectively. As an example, the apodization function used is a sine profile given by $$f(x) = \sin\left(\frac{\pi x}{L}\right) \qquad (6)$$

where L is the length of the grating and f(x) takes a value between 0 and 1. The goal of apodization is to maintain the average effective refractive index constant even though the modulation depth becomes a slowly varying function of grating length. The sine profile perturbs the effective refractive index of the associated waveguides 100 and 100' according to equations (29) and (30);

$$n_{100}(x) = n_{ave} + h_{100}f(x) \qquad (29)$$

$$n_{100'}(x) = n_{ave} - h_{100}f(x) \qquad (30)$$

where $h_i = |n_{ave} - n_i|$ is the peak refractive index modulation, $n_{ave}$ is the average effective refractive index and f(x) is the apodization profile. Once the required effective refractive index in each slice is known, the associated waveguide widths are determined to construct the grating. It should be appreciated that the cells 134E near the middle of the grating 132E will have substantially the same dimensions as the unapodized cell of FIG. 13(b).

Figure 14A:
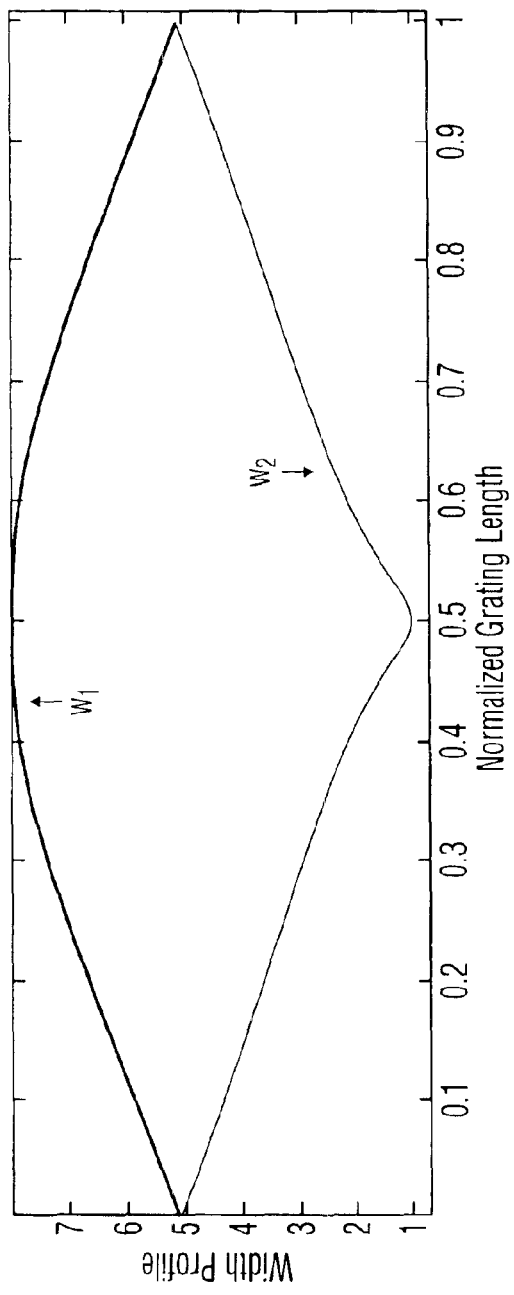
FIGS. 14(a) and 14(b) illustrate the sine apodized widths and effective refractive index respectively of a uniform periodic grating formed by a series of cells each comprising two waveguide sections.
Figure 14B:
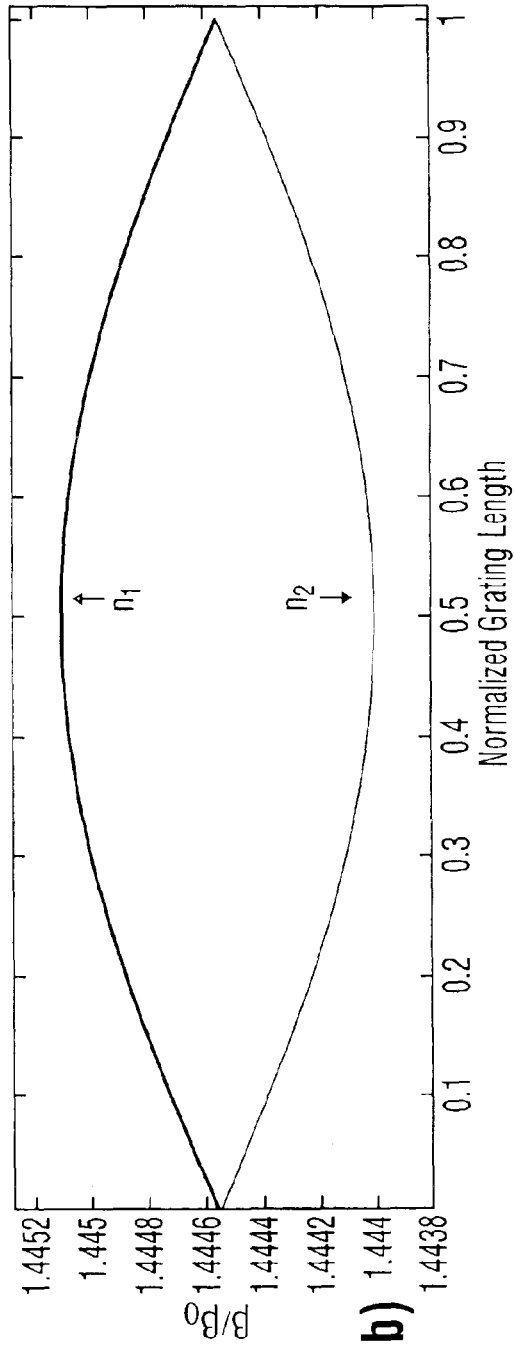
Figure 15A:
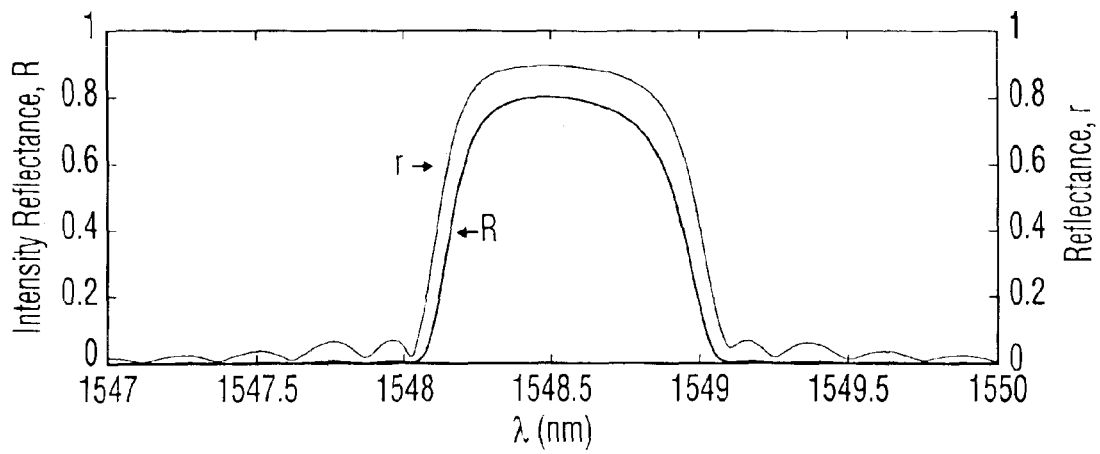
FIGS. 15(a), 15(b) and 15(c) illustrate the spectral response and group delay for a uniform sine-apodized periodic grating of the present invention.
Figure 15B:
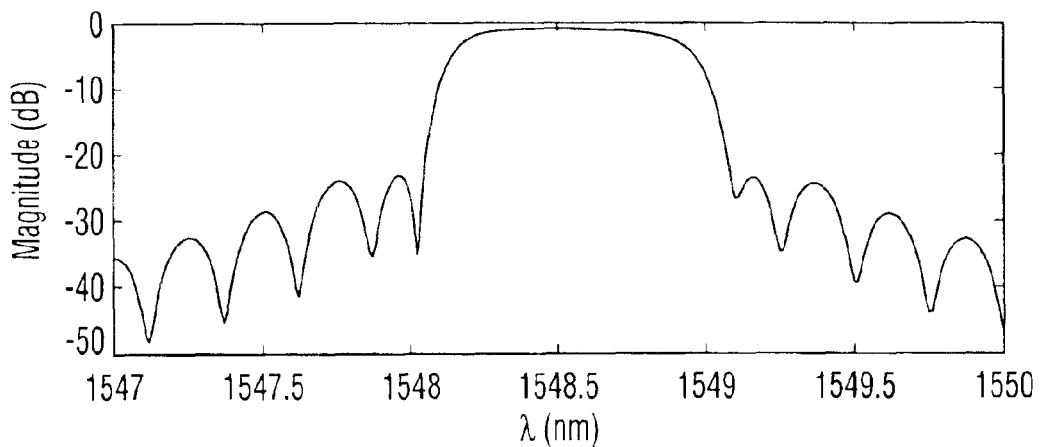
Figure 15C:
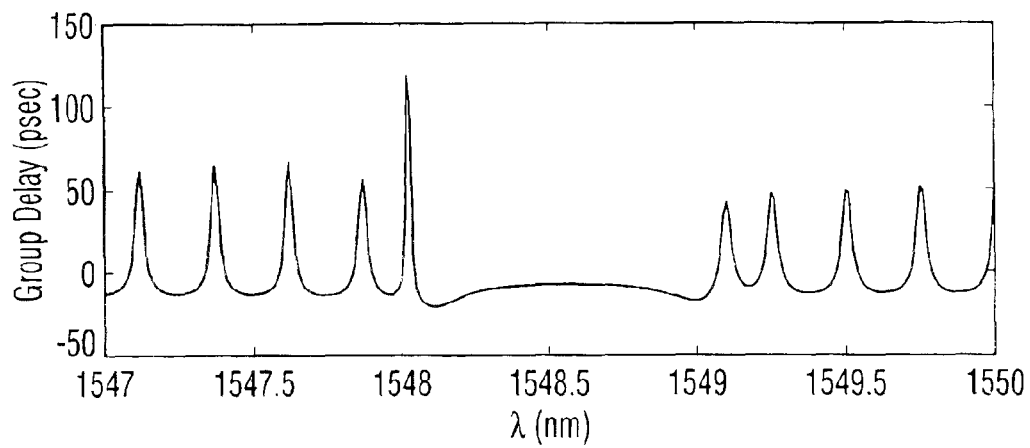

FIGS. 14(a) and 14(b) show quantitatively the variation in the width and the effective refractive index, respectively, of the apodized-uniform periodic grating over the length of the grating 132E. The variation in the widths, $w_1$ and $w_2$, of the waveguide sections 100E and 100E', imposed by the apodization profile is clearly shown in FIG. 14(a) and the corresponding variation in effective refractive index in FIG. 14(b). FIGS. 15(a), 15(b) and 15(c) illustrate the spectral performance of the grating of length 3 216 mm and period 0.536 μm. FIGS. 15(a) and 15(b) display the reflectance, linear and logarithmic, of the grating, respectively. The present embodiment yields a maximum intensity reflectance of 80.5%, with a 0.75 nm approximate bandwidth for a center wavelength of 1548.56 nm. A 22.1 dB suppression in the sidelobes is achieved due to the sine-apodization profile. FIG. 15(c) displays the group delay in picoseconds of the uniform apodized grating 132E over the useful bandwidth of the grating. As shown in FIG. 15(c), the group delay is almost flat over the useful passband of the grating.

It should be noted that the invention is not limited to the use of sinusoidal apodization as in the above-described example but extends to various other forms of apodization profile, such as Gaussian, Blackman, hyperbolic tangent, positive hyperbolic tangent, and Raised-Sinusoidal/Cosinusoidal.

Example 3

Uniform Period-Wise Interleaved Grating

Figure 16:
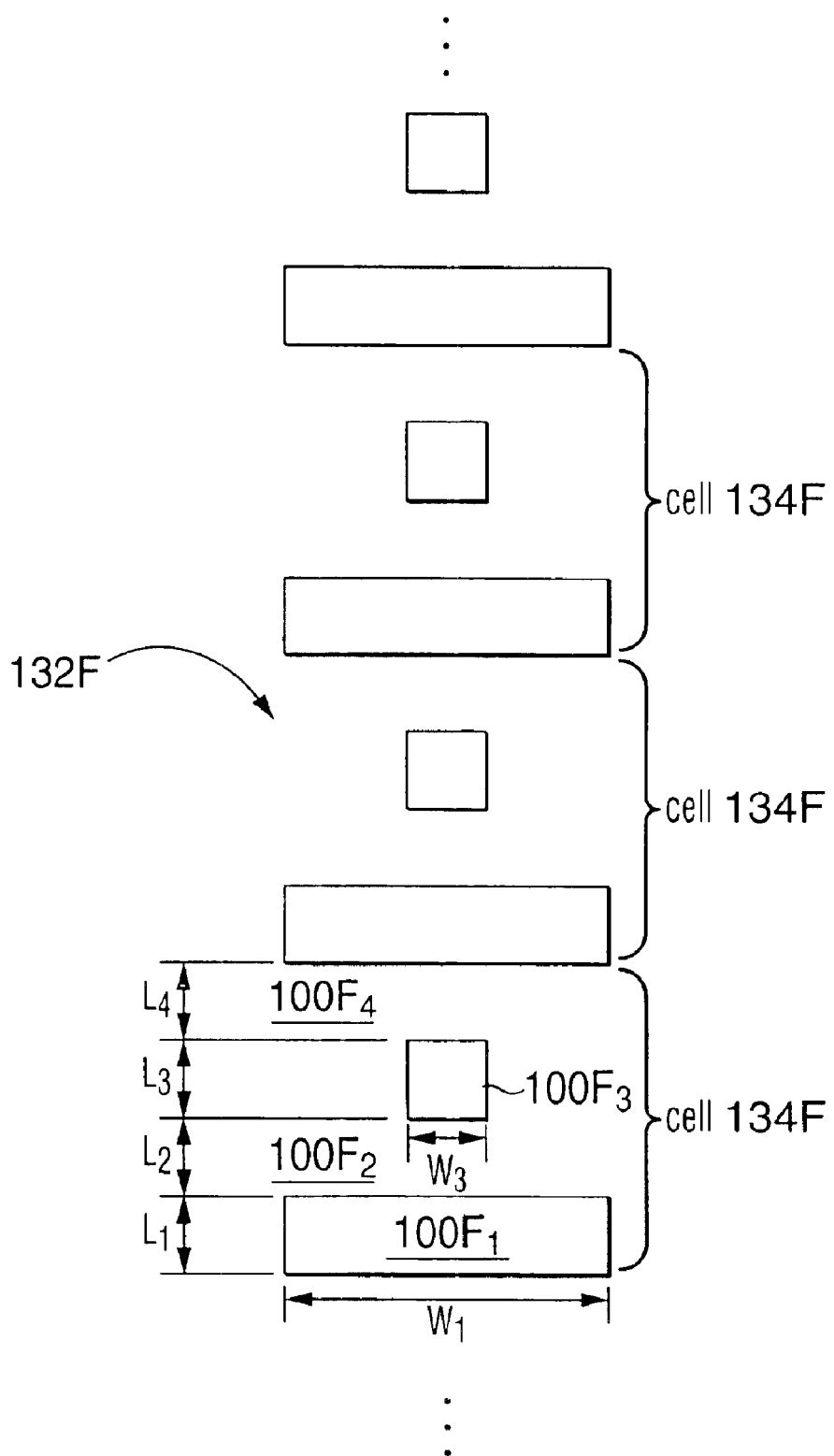
FIG. 16 is a plan view of a uniform interleaved periodic grating formed by a series of super cells each comprising four sections of equal length; two waveguide sections having different strip widths and two gaps.

FIG. 16 illustrates an example of a uniformly periodic interleaved grating 132F embodying this invention. Grating 132F comprises a series of super cells 134F each composed of four waveguide sections, 100F$_1$, 100F$_2$, 100F$_3$ and 100F$_4$, that take the form of an 8 μm wide strip, a gap, a 1 μm wide strip and a gap, respectively. The gaps are both filled by the background dielectric. The lengths $L_1$, $L_2$, $L_3$ and $L_4$ of the four waveguides sections 100F$_1$, 100F$_2$, 100F$_3$ and 100F$_4$, respectively, are adjusted such that $L_1=L_2=0.268$ μm and $L_3=L_4=0.269$ μm, for an overall period of 1.074 μm.

Figure 17A:
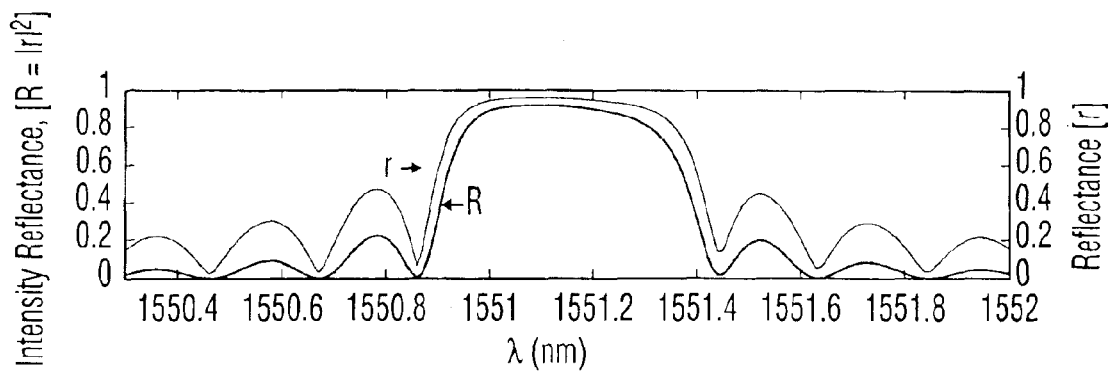
FIGS. 17(a), 17(b) and 17(c) illustrate the spectral response and group delay for a uniform interleaved periodic grating of the present invention.
Figure 17B:
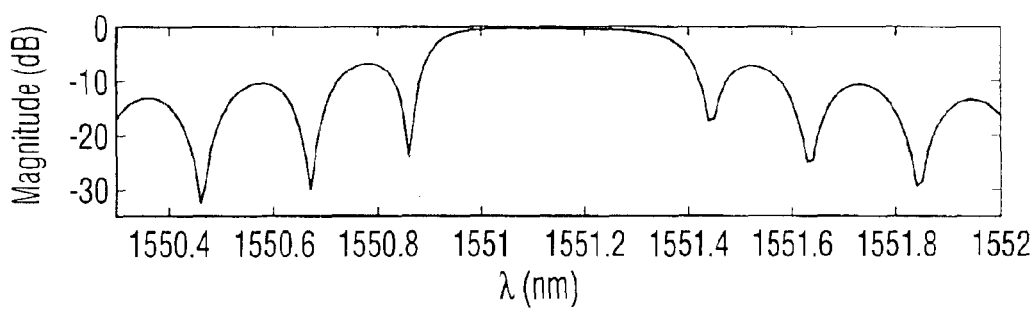
Figure 17C:
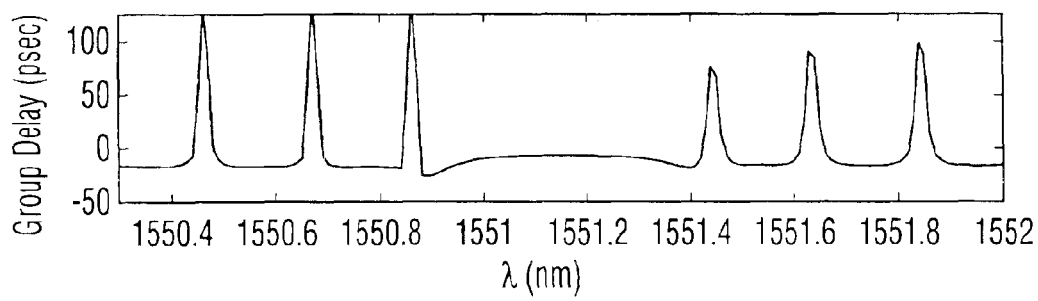

FIGS. 17(a), 17(b) and 17(c) illustrate the spectral performance of this embodiment for a grating length of 3.759 mm. FIGS. 17(a) and 17(b) display the reflectance, linear and logarithmic, respectively, of the grating. This uniform interleave embodiment yields a maximum intensity reflectance of 91.8%, with a 0.4 nm approximate bandwidth for a center wavelength of 1551.15 nm. FIG. 17(c) displays the group delay in picoseconds of the grating 132F over the useful bandwidth of the grating. As shown in FIG. 17(c), the group delay is relatively flat over the useful reflection bandwidth of the grating 132F.

Example 4

Linearly Chirped Grating

Figure 18:
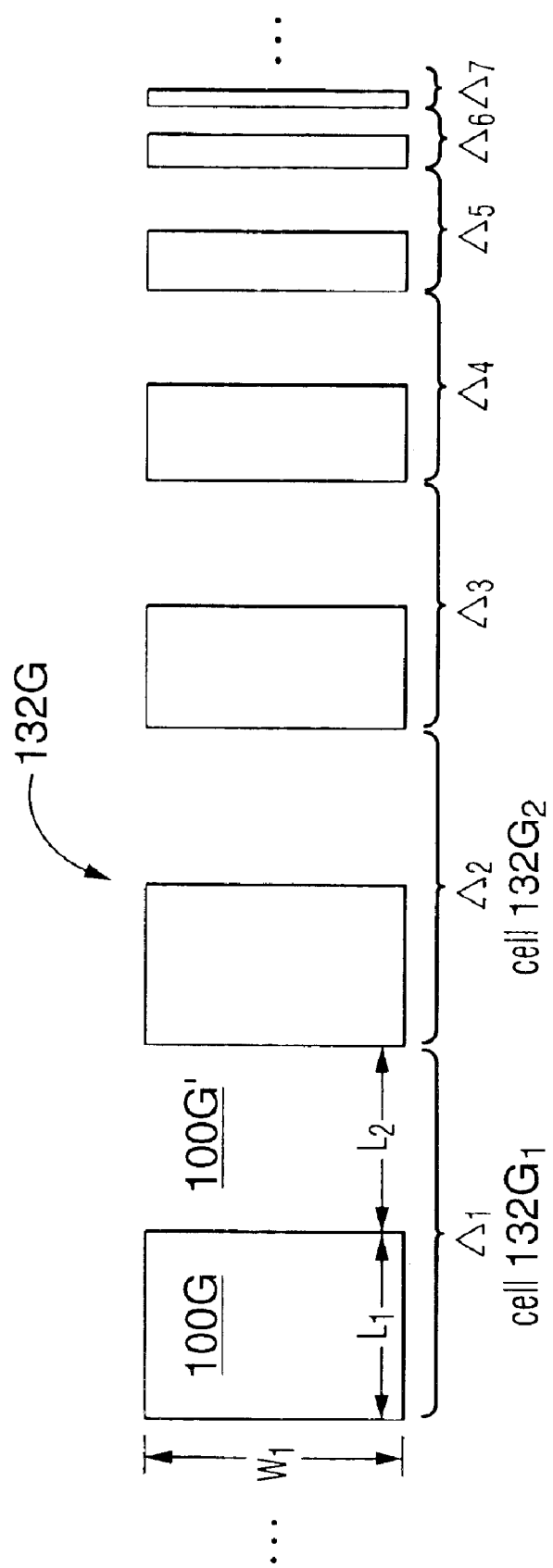
FIG. 18 is a plan view of a linearly chirped grating formed by a series of cells each comprising a waveguide section and a gap. The period or length of the sections is varied linearly between adjacent cells and each cell supports a certain duty cycle.
Figure 19A:
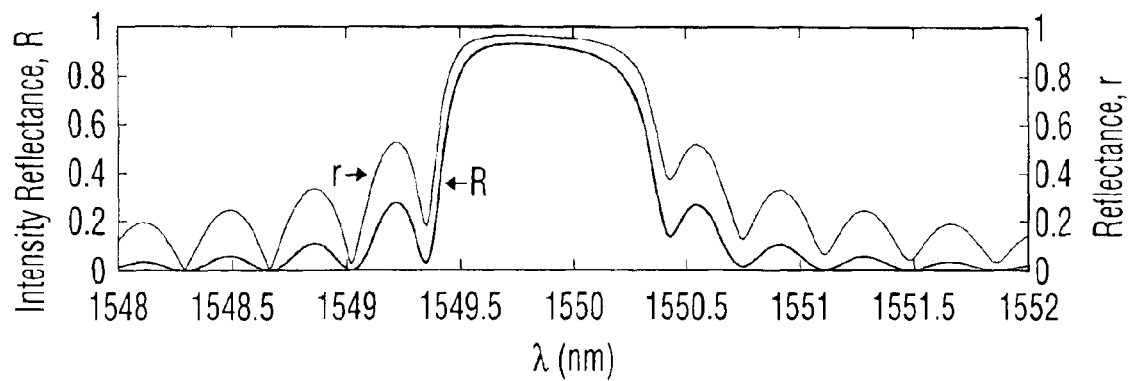
FIGS. 19(a), 19(b) and 19(c) illustrate the spectral response and group delay for a linearly chirped grating of the present invention.
Figure 19B:
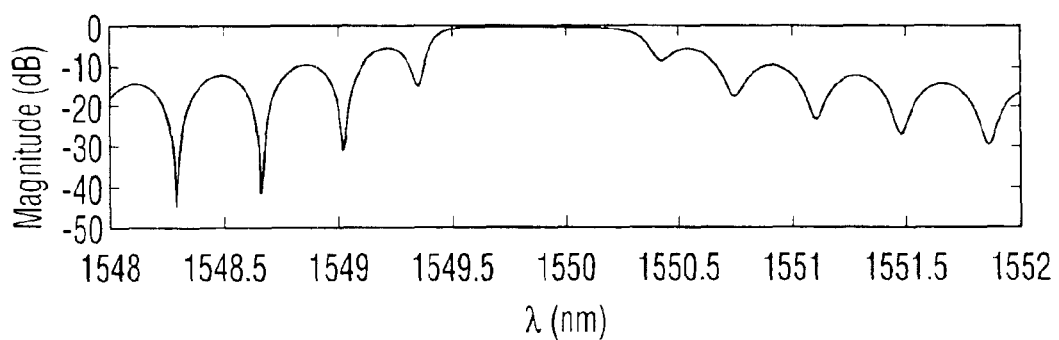
Figure 19C:
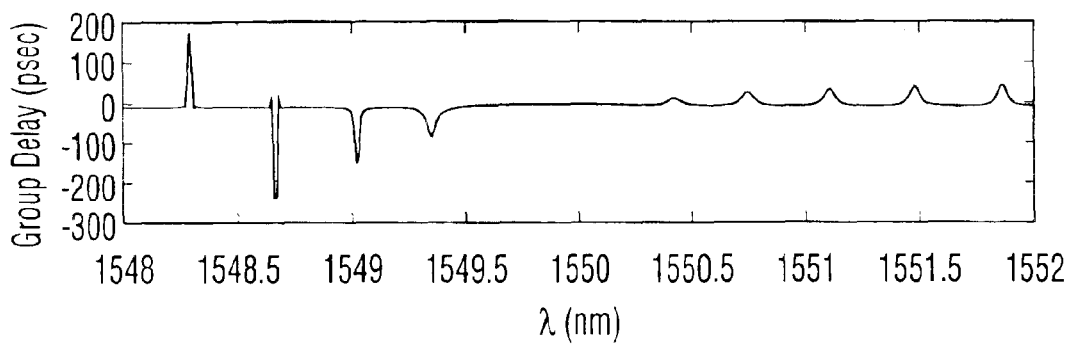

FIG. 18 illustrates one example of a linearly chirped grating 132G embodying this invention. Grating 132G comprises a series of cells 132G each composed of two waveguide sections, 100G and 100G', that take the form of an 8 µm wide strip and a gap respectively, the gap being filled by the background dielectric. The lengths $L_1$ and $L_2$ of sections 100G and 100G', respectively, decrease linearly between adjacent cells over the entire length of the grating 132G according to a chirp factor, C. The chirp factor C is equal to $0.1 \times 10^{-13}$ m. The lengths $L_1$ and $L_2$ of the first cell $132G_1$ are set to quarter-wave dimensions as detailed for a center wavelength of 1550 nm in the section captioned "Uniform Periodic gratings". FIGS. 19(a), 19(b) and 19(c) illustrate the spectral performance of this embodiment for a grating length of 2.144 mm. FIGS. 19(a) and 19(b) display the reflectance, linear and logarithmic, of the grating, respectively. The embodiment yields a maximum intensity reflectance of 93%, with a 1 nm approximate bandwidth for a center wavelength of approximately 1549.85 nm. FIG. 19(c) displays the group delay in picoseconds of the grating 132G over the useful bandwidth of the grating. As shown in FIG. 19(c), the group delay is almost flat over the useful reflection bandwidth of the grating.

Example 5

Step Chirped Grating

Figure 20:
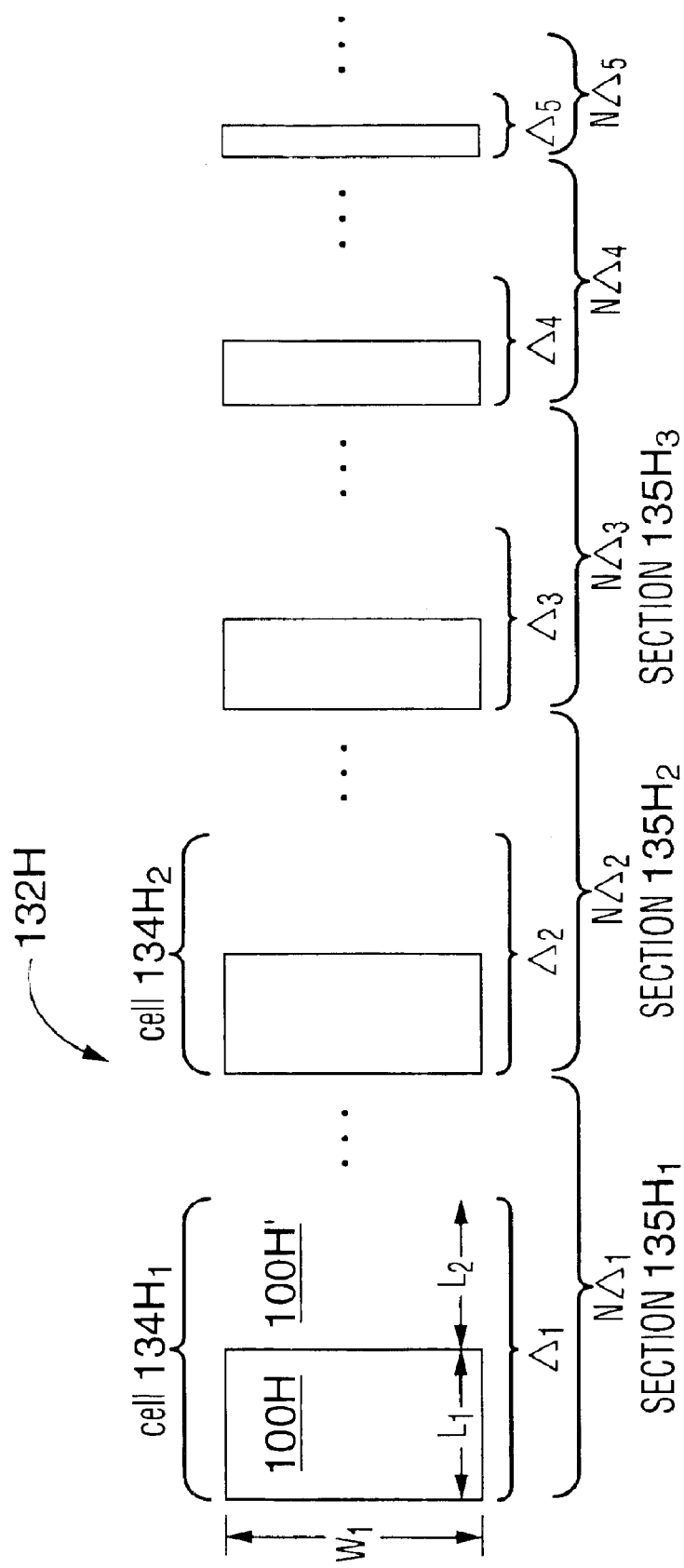
FIG. 20 is a plan view of a linearly step-chirped grating formed by a series of M uniform periodic sections of N cells each comprising a waveguide section and a gap where the lengths of these sections are varied linearly between adjacent periodic sections.

FIG. 20 illustrates one example of a step-chirp linear grating 132H embodying the present invention. Grating 132H comprises a series of cells 134H each composed of two waveguide sections, 100H and 100H', taking the form of an 8 µm wide strip 100H and a gap 100H', respectively. The gap being filled by the background dielectric. The lengths $L_1$ and $L_2$ of sections 100H and 100H', respectively, decrease linearly between adjacent periodic sections over the entire length of the grating 132H according to a chirp factor, C. The lengths $L_1$ and $L_2$ of the first cell $134H_1$ are set to quarter-wave dimensions as detailed above, for a center wavelength of 1550 nm, in the section captioned "Uniform Periodic gratings". The grating 132H is composed of 20 different uniform sections $135H_1, \ldots 135H_{20}$ each comprising 200 identical cells the lengths of which differ from those of cells in adjacent sections according to the chirp factor $C=1\times10^{-12}$ m.

Figure 21A:
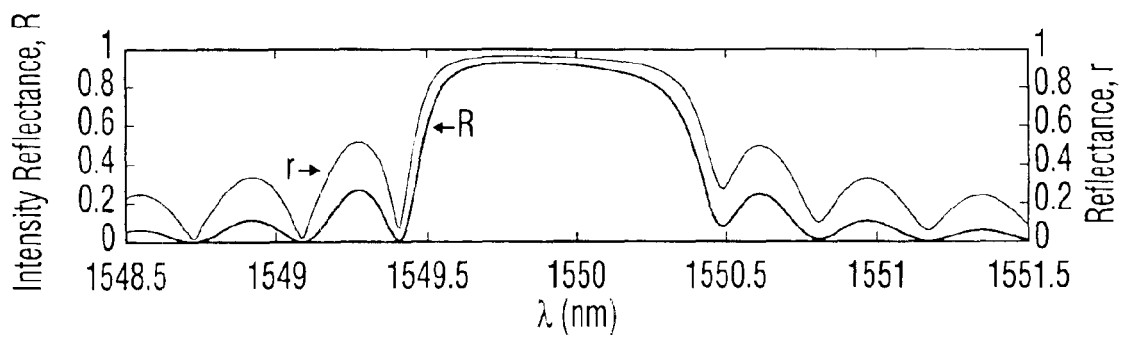
FIGS. 21(a), 21(b) and 21(c) illustrate the spectral response and group delay for a linearly step-chirped grating of the present invention.
Figure 21B:
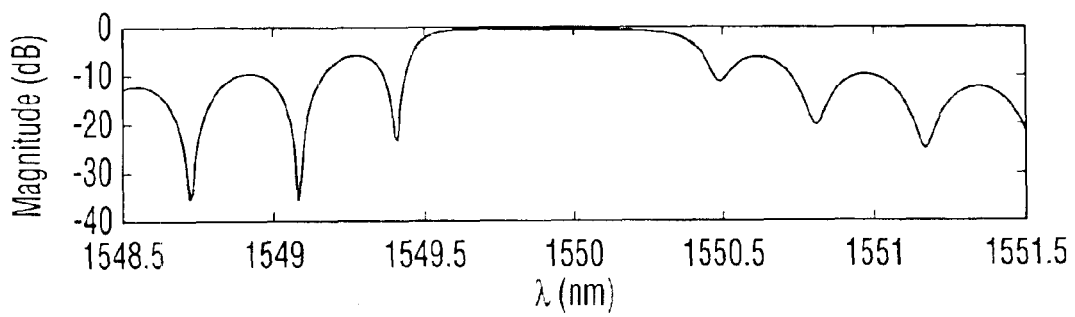
Figure 21C:
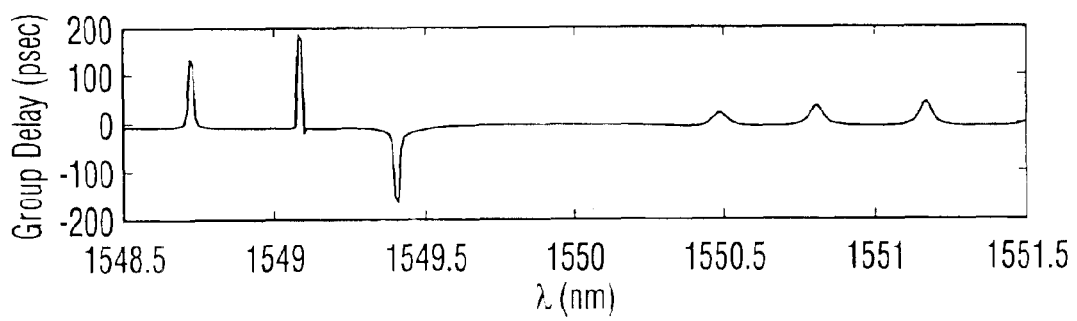

FIGS. 21(a), 21(b) and 21(c) illustrate the spectral performance of the grating 132H for a grating length of 2.1458 mm. FIGS. 21(a) and 21(b) display the reflectance, linear and logarithmic, respectively, of the grating 132H. The grating 132H yields a maximum intensity reflectance of 93%, with a 0.8 nm approximate bandwidth for a center wavelength of 1549.9 nm. FIG. 21(c) displays the group delay in picoseconds of the grating 132H over the useful bandwidth of the grating. As shown in FIG. 21(c), the group delay is relatively flat over the useful reflection bandwidth of the grating.

Example 6

Chirped Period-Wise Interleaved Gratings

FIG. 22 illustrates one example of a chirp-interleaved grating 132I embodying the present invention. Grating 132I, shown in FIG. 22, comprises a series of cells each composed of two waveguide sections, 100I and 100I', which take the form of an 8 µm wide strip and a gap, respectively, the gap being filled by the background dielectric. The series of cells is formed by a first set of cells $\Lambda_1, \Lambda_2, \ldots, \Lambda_S$ and a second set of cells $\Lambda'_1, \Lambda'_2, \ldots, \Lambda'_S$. The two sets of cells are interleaved alternately, and are identical to each other, but transposed longitudinally one relative to the other. Thus, the grating 132I shown in FIG. 22 is the result of the period-by-period interleaving of the linearly-chirped gratings shown in FIGS. 23(a) and 23(b).

Figure 24A:
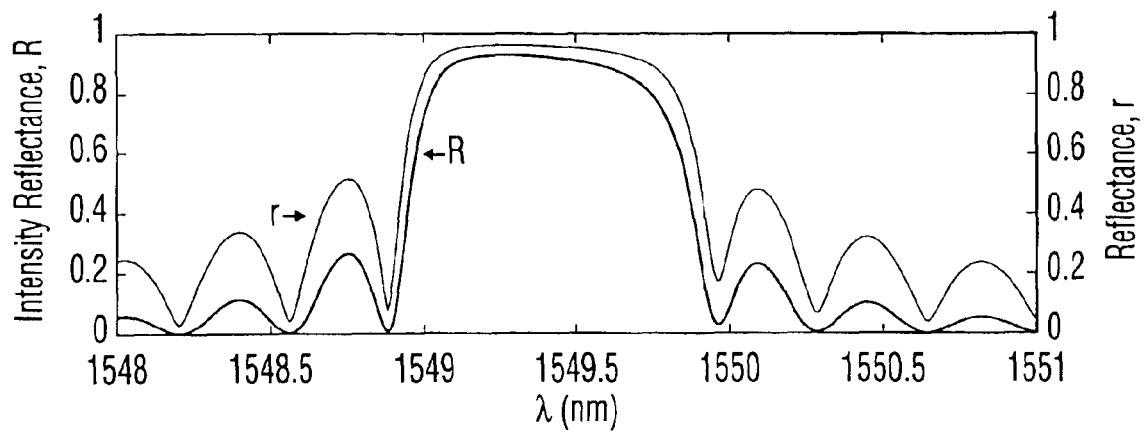
FIGS. 24(a), 24(b) and 24(c) illustrate the spectral response and group delay for a linearly chirped interleaved grating of the present invention.
Figure 24B:
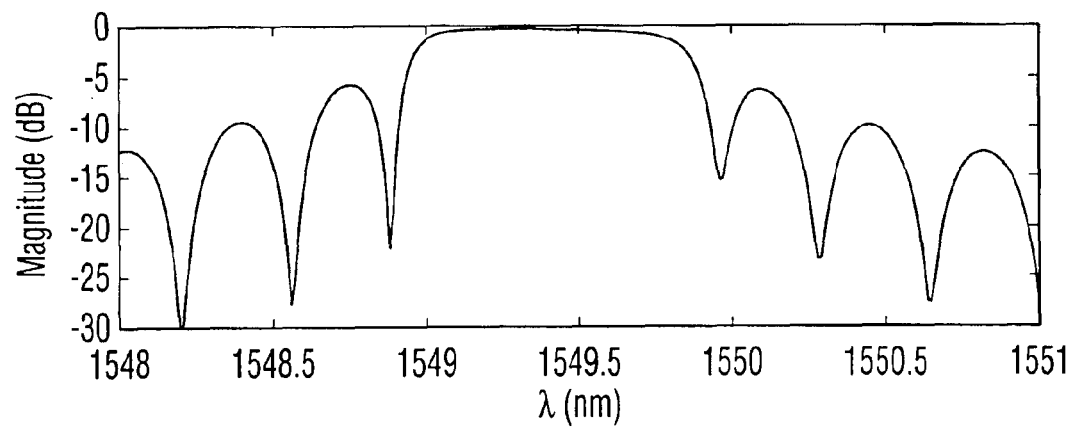
Figure 24C:
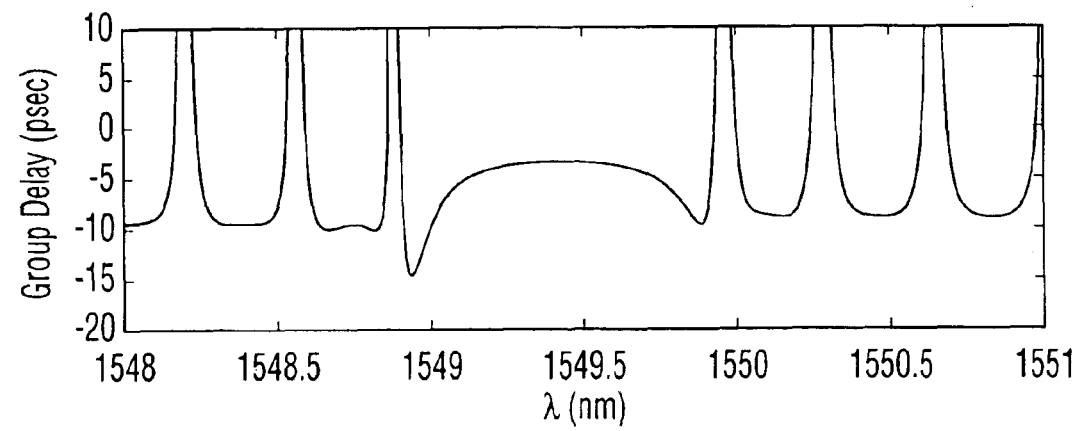

FIG. 23(a) shows a linearly-chirped grating where the lengths, $L_1$ and $L_2$, decrease linearly as the grating is traversed according to a chirp factor of $C=0.1\times10_{-12}$ m. The linearly-chirped grating of FIG. 23(a) has 2000 periods. The lengths of its first cell are set to quarter-wave dimensions as detailed above for a center wavelength of 1550 nm. FIG. 23(b) is the mirror image (flipping or transposing from left-to-right) of the grating of FIG. 23(a). FIGS. 24(a), 24(b) and 24(c) illustrate the spectral performance of the grating 132I for a grating length of 2.145 mm or 4000 periods. FIGS. 24(a) and 24(b) display the reflectance, linear and logarithmic, respectively, of the grating 132I. The grating 132I yields a maximum intensity reflectance of 92.9%, with an approximate bandwidth of 0.8 nm for a center wavelength of 1549.4 nm. FIG. 24(c) displays the group delay in picoseconds of this grating 132I over the useful bandwidth of the grating. As shown in FIG. 24(c), the group delay is almost flat over the useful reflection bandwidth of the grating.

Summary Of Design Methodology

FIG. 25 is a block diagram depicting the disclosed design sequence as applied to the design of all the preferred embodiments described hereinbefore. The design process begins with the definition of the waveguide structure to be analyzed as shown in the top left box of FIG. 25. This information is used with our MoL formulation to solve for the dispersion characteristics of the waveguides. As it is impractical to find the modal solutions of a large number of waveguide widths, a cubic-spline interpolant of the geometrical dispersion characteristics of the waveguide is constructed. These are the building blocks for the gratings. Starting in the top right box of FIG. 25 the specifications for the grating and the design architecture of interest are selected. As can be seen from the first box, captioned "Define grating specification", the specifications include Dimension resolution, Center wavelength, Side lobe suppression level, Reflectance level and Bandwidth. It will be appreciated that the dimensions given in the foregoing examples are numerical values rounded to the nearest nanometer. In practice the actual resolution will be determined by the fabrication process to be used. Hence, the first item, "Define resolution" will do so consistent with the fabrication process to be used. The second box, captioned "Select Design Architecture", lists the available architectures from which a selection will be made. As shown in the box captioned "Definition of grating and construction of equivalent stack model", the grating architecture and specifications are combined with the waveguide information and used to design the 'cells' composing the grating and construct the equivalent stack model of the grating using the results from the MoL formulation. A TMM approach is then used to estimate the spectral performance of the grating using the equivalent stack model. An iterative process can also be applied, as shown, to optimize characteristics. More particularly, as shown by the final box of FIG. 25, and the loop back to the box "Definition of grating and construction of equivalent stack model", if the spectral performance of the modeled grating does not satisfy desired specifications, the Definition process, TMM step and Spectral performance analysis may be repeated iteratively, the design architecture being adjusted in each iteration in accordance with the design rules as set out hereinbefore, until a satisfactory spectral performance is achieved.

It is envisaged that the space between two strips could be either the same material as the background material, or a different material. For example, the space could be formed by etching a channel and filling it with the different material.

It should be appreciated that FIGS. 22, 23(a) and 23(b) show only five cells in each set for simplicity; in practice there would be many more cells.

Although the specific embodiments shown in FIGS. 16 and 22 interleave the same kind of sets of cells to form the grating, it is envisaged that two different sets of cells, for example a periodic set and a chirped set, to form the grating.

It should be appreciated that the interleaved gratings could be fabricated using an alternative to the plasmon-polariton waveguide structures disclosed herein. For example, they could be fabricated using planar dielectric waveguides.

While the invention has been described in detail in the foregoing specification, it will be understood by those skilled in the art that variations may be made without departing from the spirit and scope of the invention, being limited only by the appended claims.

References

1. Tredicucci, A. et al. "Single-mode surface-plasmon laser", Applied Physics Letters, vol. 76, no. 16, p. 2164, 2000.
2. Berini, P. "Plasmon-polariton waves guided by thin lossy metal films of finite width: Bound modes of symmetric structures". Physical Review B, vol. 61, no. 15, p. 10484, 2000.
3. Charbonneau, R., Berini, P., et al. "Long-Range Plasmon-Polariton Wave Propagation in Thin Metal Films of Finite-Width Excited Using an End-Fire Technique". Proceedings of SPIE, vol. 4087, p. 534, 2000.
4. Berini, P. "Plasmon-polariton modes guided by a metal film of finite width bounded by different dielectrics", Optics Express, vol. 7, no. 10, p. 329, 2000.
5. Berini, P. "Plasmon-polariton modes guided by a metal film of finite width". Optics Letters, vol.24, no. 15, p. 1011, 1999.
6. Charbonneau, R., Berini, P. "Experimental observation of plasmon-polariton waves supported by a thin metal film of finite width", Optics Letters, vol.25, no.11, p. 844, 2000.
7. Berini, P. "Plasmon-Polariton Waves Guided by Thin Lossy Metal Films of Finite Width: Bound Modes of Asymmetric Structures", Physical Review B, Vol 63, 125417, 2001.
8. BOARDMAN, A. D., Editor, *Electromagnetic Surface Modes*. Wiley Interscience, 1982.
9. PREGLA, R., PASCHER, W. "The Method of Lines", *Numerical Techniques for Microwave and Millimeter-Wave Passive Structures*. Wiley Interscience, 1989. T. ITOH, Editor
10. BERINI, P., WU, K. "Modeling Lossy Anisotropic Dielectric Waveguides With the Method of Lines", *IEEE Transactions on Microwave Theory and Techniques*, Vol. MTT-44, No. 5 (May 1996), pp. 749–759.
11. BERINI, P., STÖHR, A., WU, K., JÄGER, D. "Normal Mode Analysis and Characterization of an InGaAs/GaAs MQW Field-Induced Optical Waveguide Including Electrode Effects", *Journal of Lightwave Technology*, Vol. 14, No. 10 (October 1996), pp. 2422–2435.
12. Yeh, Pochi. "Optical Waves in Layered Media", Wiley, 1988.
13. Vinogradox, A. V. "X-ray and far uv multilayer mirrors: principles and possibilities", Applied Optics, vol. 16, no. 1, p.89, 1977.

What is claimed is:

1. A grating, suitable for filtering optical radiation, comprising a plurality of concatenated grating sections, physical characteristics of each section differing from physical characteristics of each adjacent section so that the propagation constants of adjacent grating sections differ, wherein at least some of the sections each comprise a waveguide structure formed by a thin strip (100) of material having a relatively high free charge carrier density surrounded by material having a relatively low free charge carrier density, the strip having finite width (W) and thickness (t) with dimensions such that optical radiation having a wavelength in a predetermined range couples to the strip and propagates along the length of the strip as a plasmon-polariton wave.

2. A grating according to claim 1, wherein said grating sections are arranged in cells each comprising a pair of adjacent grating sections, the cells being identical.

3. A grating according to claim 1, wherein grating sections are arranged in cells each comprising a pair of adjacent grating sections, the grating being non-uniform.

4. A grating according to claim 3, wherein the cells of the grating vary along its length in a chirped manner.

5. A grating according to claim 4, wherein the chirping is linear.

6. A grating according to claim 4, wherein the chirping is non-linear.

7. A grating according to claim 1, wherein the grating comprises at least two interleaved sets of cells, each cell comprising a pair of adjacent grating sections.

8. A grating according to claim 1, wherein the grating comprises a plurality of segments, each segment comprising a set of cells that axe similar in size and shape, but the cells of each segment differing in shape and/or size from the cells of other segments, each cell comprising a pair of adjacent grating sections.

9. A grating according to claim 1, wherein the grating comprises a series of cells, each cell comprising a pair of adjacent grating sections, said series comprising a first set of cells ($\Lambda_1, \Lambda_2, \ldots \Lambda_S$) and a second set of cells ($\Lambda_1', \Lambda_2', \ldots \Lambda_S'$), the two sets of cells being different from each other and interleaved alternately cell by cell.

10. A grating according to claim 9, wherein the first set is equivalent to the second set transposed longitudinally.

11. A grating according to any one of claims 1, 3, 7, 8 and 9, wherein said physical characteristics of at least some of the grating sections vary along the length of the grating such that an effective refractive index profile of the grating is apodized.

12. A grating according to claim 11, wherein the apodization is sinusoidal.

13. A grating according to anyone of claims 1, 2, 3, 7, 8 and 9, wherein each of said grating sections comprises a said waveguide structure.

14. A grating according to claim 11, wherein each of said grating sections comprises a said waveguide structure.

15. A grating according to claim 12, wherein each of said grating sections comprises a said waveguide structure.

16. A grating according to claim 1, wherein respective strips of different said waveguide structures are made of different material.

17. A grating according to claim 1, wherein respective strips of different said waveguide structures have different widths.

18. A grating according to claim 1, wherein respective strips of different said waveguide structures have different thicknesses.

19. A grating according to claim 1, wherein said strips are other than rectangular in shape in plan.

20. A grating according to claim 1, wherein said grating sections are arranged in cells each comprising a pair of grating sections, each pair of adjacent grating sections in a said cell comprising two trapezoidal strips with their broader edges juxtaposed.

21. A grating according to any one of claim 1, 2, 3, 7, 8, 9, 16, 17, 18 and 19, wherein each strip has a substantially square cross-sectional shape.

22. A grating according to claim 11, wherein each strip has a substantially square cross-sectional shape.

23. A grating according to any one of claims 1, 2, 3, 7, 8, 9, 16, 17, 18 and 19, wherein said grating sections each comprise a waveguide structure and the respective plurality of strips are integral with each other.

24. A grating according to claim 21, wherein said grating sections each comprise a waveguide structure and the respective plurality of strips are integral with each other.

25. A grating according to any one of claims 1, 2, 3, 7, 8, 9, 16, 17, 18 and 19, further comprising adjusting means for modifying an optical response of the grating.

26. A grating according to claim 21, further comprising adjusting means for modifying an optical response of the grating.

27. A grating according to claim 23, further comprising adjusting means for modifying an optical response of the grating, the adjusting means comprising at least one electrode positioned near the grating structure and connected to one terminal of a voltage source, a second terminal of the voltage source being connected to at least one said strip.

28. A grating according to claim 27, wherein the material between the grating structure and the electrode is an electro-optic material and the voltage source provides a potential gradient therein.

29. A grazing according to any one of claims 1, 2, 3, 7, 8, 9, 16, 17, 18 and 19, wherein the plurality of concatenated grating sections comprise a series of said waveguide structures and a corresponding series of spaces alternating with said waveguide structures.

30. A grating according to claim 29, further comprising adjusting means for modifying an optical response of the grating, the adjusting means comprising a voltage source for providing a potential difference between the strips of alternate ones of the series of waveguide structures and the strips of intervening ones of the waveguide structures.

31. A grating according to claim 30, wherein the material between the sections is an electro-optic material and the voltage source provides a potential gradient therein.

32. A grating according to claim 31, wherein the spaces are filled with a material that is the same as said surrounding material.

33. A grating according to claim 1, comprising at least a second said plurality of concatenated grating sections disposed alongside and substantially parallel to the first-mentioned plurality of concatenated grating sections to form a two-dimensional may of grating sections, the size and shape of the strips in the grating sections being determined such that stop bands in the optical spectrum appear at desired spectral locations.

34. A grating according to claim 33, comprising at least a second said two-dimensional array of grating sections, the arrays being disposed in respective different planes that extend adjacent and substantially parallel to each other.

35. A method of producing a grating suitable for filtering optical radiation within a specified range of wavelengths and formed from waveguide strips surrounded by a dielectric material, the method comprising the steps of:

(i) using a numerical analysis method, deriving for said wavelength, a strip of a particular material, and a particular surrounding dielectric material, normalized phase constant ($\beta/\beta_0$) and normalized attenuation constant ($\alpha/\beta_0$) for a particular strip thickness and each of several strip widths, or for a particular strip width and for each of a plurality of strip thicknesses;

(ii) determining a particular structure for the grating as comprising a series of strips, the series having a predetermined overall length, adjacent strips in the series having different widths, or a series of strips all having the same width and with spaces between adjacent ones of the strips, or a series of strips having spaces between adjacent strips, alternate strips having different widths, and selecting a particular length for each of said strips and, where applicable, each of said spaces;

(iii) using the normalized phase constants and normalized attenuation constants derived in step (I), obtaining the complex effective refractive index ($\tilde{n}_{eff}=\beta/\beta_0-j\alpha/\beta_0$) of the main mode supported by each of said strips in said series;

(iv) constructing an equivalent stack of dielectric slices, each slice taking on the complex effective refractive index of the corresponding strip in said series of strips, or, where the slice corresponds to a space, the refractive index of the medium in said space;

(v) deriving to optical response of the equivalent stack;

(vi) if the derived optical response is not the desired optical response, repeating steps (ii), (iii), (iv) and (v) with different parameters for the grating; and (vii) if the derived optical response is the desired optical response, fabricating the grating with said particular structure.

36. A method according to claim 35, wherein the optical response is derived using a transfer matrix method or coupled mode theory.

37. A method according to claim 35, for producing a uniform grating, wherein the optical response is derived using the Bloch theorem.

38. A method according to claim 35, 36, or 37, wherein the numerical analysis method is selected from the Method of Lines, the Finite Element Method and the Finite Difference Method.

* * * * *